US011782427B2

(12) United States Patent
Mcgregor et al.

(10) Patent No.: US 11,782,427 B2
(45) Date of Patent: *Oct. 10, 2023

(54) AUGMENTED REALITY HUMAN MACHINE INTERFACE TESTING

(71) Applicant: Rockwell Automation Technologies, Inc., Mayfield Heights, OH (US)

(72) Inventors: Ian Mcgregor, Shepperton (GB); Adam Davidson, Reading (GB); David Dawkins, Reading (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,051

(22) Filed: Oct. 24, 2022

(65) Prior Publication Data
US 2023/0064632 A1 Mar. 2, 2023

Related U.S. Application Data

(63) Continuation of application No. 16/791,107, filed on Feb. 14, 2020, now Pat. No. 11,526,159.

(51) Int. Cl.
*G06F 3/04815* (2022.01)
*G06F 3/0483* (2013.01)
(Continued)

(52) U.S. Cl.
CPC ..... *G05B 19/41885* (2013.01); *G06F 3/0483* (2013.01); *G06F 3/04815* (2013.01);
(Continued)

(58) Field of Classification Search
CPC .... G05B 19/41885; G05B 2219/32014; G05B 2219/36133; G05B 23/0243;
(Continued)

(56) References Cited

U.S. PATENT DOCUMENTS 9,989,958 B2 6/2018 Asenjo et al.
10,318,904 B2 6/2019 Johnson et al.
(Continued)

FOREIGN PATENT DOCUMENTS

EP  2 871 540 A2  5/2015
EP  3 318 944 A2  5/2018
(Continued)

OTHER PUBLICATIONS

Communication pursuant to Article 94(3) EPC received for European Patent Application Serial No. 20204528.2 dated Jan. 4, 2023, 5 pages.

(Continued)

*Primary Examiner* — Jitesh Patel
(74) *Attorney, Agent, or Firm* — Amin, Turocy & Watson, LLP

(57) ABSTRACT

An industrial virtual reality (VR) system includes visualization processing capabilities that allow an augmented reality (AR) human-machine interface (HMI) application to be tested within a virtual representation of the plant environment. This approach can yield an interactable AR HMI that simulates, within the VR environment, what a wearer of an AR appliance will see while traversing the physical plant. In this way, proper operation of the AR HMI can be verified prior to commissioning of the physical system. This can include ensuring that graphics are tied to the correct data points, confirming correct and non-obtrusive locations of graphics within the user's field of view.

20 Claims, 15 Drawing Sheets

(51) Int. Cl.
    *G06T 13/20* (2011.01)
    *G06V 20/20* (2022.01)
    *G05B 19/418* (2006.01)
    *G06T 19/00* (2011.01)

(52) U.S. Cl.
    CPC ............ *G06T 13/20* (2013.01); *G06T 19/006* (2013.01); *G06V 20/20* (2022.01); *G05B 2219/32014* (2013.01); *G05B 2219/36133* (2013.01)

(58) Field of Classification Search
    CPC ....... G05B 2219/24065; G06F 3/04815; G06F 3/0483; G06F 2111/18; G06F 30/20; G06F 3/011; G06T 13/20; G06T 19/006; G06V 20/20
    See application file for complete search history.

(56) References Cited

U.S. PATENT DOCUMENTS

| | | | |
|---|---|---|---|
| 10,596,704 | B1 | 3/2020 | Ramanujam et al. |
| 10,678,233 | B2 | 6/2020 | Cella et al. |
| 10,996,642 | B2 | 5/2021 | Wang et al. |
| 11,080,435 | B2 | 8/2021 | Bourhani et al. |
| 2009/0089030 | A1 | 4/2009 | Sturrock et al. |
| 2009/0089031 | A1 | 4/2009 | Sturrock et al. |
| 2009/0319058 | A1 | 12/2009 | Rovaglio et al. |
| 2013/0204587 | A1 | 8/2013 | Cheng et al. |
| 2013/0275091 | A1 | 10/2013 | Peterson et al. |
| 2014/0180644 | A1 | 6/2014 | Maturana et al. |
| 2015/0134313 | A1 | 5/2015 | Maturana et al. |
| 2015/0161821 | A1* | 6/2015 | Mazula ................. G06T 19/006 345/419 |
| 2015/0277406 | A1 | 10/2015 | Maturana et al. |
| 2016/0182309 | A1 | 6/2016 | Maturana et al. |
| 2017/0025040 | A1 | 1/2017 | Maturana et al. |
| 2017/0053047 | A1 | 2/2017 | Mcdaniel |
| 2017/0249129 | A1* | 8/2017 | McDaniel ................. G06F 8/35 |
| 2018/0131907 | A1* | 5/2018 | Schmirler ............ H04N 23/698 |
| 2019/0221037 | A1 | 7/2019 | Sugaya |
| 2020/0012265 | A1 | 1/2020 | Thomsen et al. |
| 2020/0034501 | A1 | 1/2020 | Duff et al. |
| 2020/0142388 | A1* | 5/2020 | Maggiore ............... H04W 4/33 |

FOREIGN PATENT DOCUMENTS

| | | |
|---|---|---|
| EP | 3 798 775 A1 | 3/2021 |
| WO | 2016/053337 A1 | 4/2016 |

OTHER PUBLICATIONS

Notice of Allowance received for U.S. Appl. No. 17/034,688 dated Feb. 7, 2023, 119 pages.
Notice of Allowance received for U.S. Appl. No. 17/726,716 dated Jan. 13, 2023, 58 pages.
Non-Final Office Action received for U.S. Appl. No. 16/679,522 dated Jun. 9, 2021, 107 pages.
Beier, Klaus peter "Web-Based Virtual Reality in Design and Manufacturing Applications". 1st International Euro Conference on Computer Applications and Information Technology in the Maritime Industries, 2000 11 Pages.
Extended European Search Report received for European Patent Application Serial No. 20204067.1 dated Mar. 24, 2021, 09 pages.
Dahmen et al., "Experimentable Digital Twins for a Modeling and Simulation-based Engineering Approach", IEEE International Systems, XP033456884, DOI: 10.1109/SYSENG.2018.8544383, Oct. 1, 2018, 08 pages.
Extended European Search Report received for European Patent Application Serial No. 20204528.2 dated Apr. 6, 2021, 10 pages.
Non-Final Office Action received for U.S. Appl. No. 16/679,503 dated Aug. 3, 2021, 136 pages.
Negri et al., "A review of the roles of digital twin in CPS-based production systems", 27th International Conference on Flexible Automation and Intelligent Manufacturing, Procedia Manufacturing, vol. 11, Jun. 27-30, 2017, pp. 939-948.
Luo et al., "MIDAS: Multidisciplinary interactive design and analysis system-integration of ASTROS and I-DEAS", 37th Structure, Structural Dynamics and Materials Conference, 1996, 16 pages.
Dominik et al., "Towards a Digital Twin: How the Blockchain can Foster E/E-Traceability in Consideration of Model-Based Systems Engineering", DS 87-3 Proceedings of the 21st International Conference on Engineering Design, vol. 3: Product, Services and Systems Design, Aug. 21-25, 2017, pp. 321-330.
Jakob et al., "Virtual Commissioning and construction of a digital twin for Smarta Fabriker", Chalmers, 2018, 36 pages.
Warmefjord et al., "Inspection Data to Support a Digital Twin for Geometry Assurance", ASME International Mechanical Engineering Congress and Exposition, vol. 58356, Nov. 3-9, 2017, pp. 1-10.
Non-Final Office Action received for U.S. Appl. No. 17/034,688 dated Sep. 13, 2021, 49 pages.
Extended European Search Report received for EP Patent Application Serial No. 21156811.8 dated Jul. 15, 2021, 11 pages.
Communication Pursuant to Rule 69 EPC received for EP Patent Application Serial No. 21156811.8 dated Aug. 23, 2021, 2 pages.
Final Office Action received for U.S. Appl. No. 16/679,503 dated Dec. 13, 2021, 59 pages.
Notice of Allowance received for U.S. Appl. No. 16/679,522 dated Dec. 22, 2021, 101 pages.
Final Office Action received for U.S. Appl. No. 17/034,688 dated Jan. 7, 2022, 81 pages.
Extended European Search Report received for EP Patent Application Serial No. 21186087.9 dated Jan. 5, 2022, 13 pages.
Non-Final Office Action received for U.S. Appl. No. 16/679,503 dated Mar. 28, 2022, 82 pages.
Guivarch et al., "Creation of Helicopter Dynamic Systems Digital Twin Using Multibody Simulations", CIRP Annals-Manufacturing Technology, 2019, vol. 68, pp. 133-136.
Non-Final Office Action received for U.S. Appl. No. 16/791,107 dated May 25, 2022, 41 pages.
Non-Final Office Action received for U.S. Appl. No. 17/034,688 dated Apr. 9, 2022, 100 pages.
Anagnostou et al., "A Distributed Simulation Methodological Framework for OR/MS Applications", Simulation Modelling Practice and Theory, 2017, vol. 70, pp. 101-119.
Ge et al., "Plant-wide Industrial Process Monitoring: A Distributed Modeling Framework", IEEE Transactions on Industrial Informatics, Feb. 2016, vol. 12, No. 1, pp. 310-321.
Communication pursuant to Rule 69 EPC received for European Patent Application Serial No. 21196290. 7 dated Apr. 4, 2022, 2 pages.
Communication pursuant to Rule 69 EPC received for European Patent Application Serial No. 21186087.9 dated Apr. 4, 2022, 2 pages.
Final Office Action received for U.S. Appl. No. 16/679,503 dated Jul. 13, 2022, 115 pages.
Final Office Action received for U.S. Appl. No. 17/034,688 dated Jul. 1, 2022, 39 pages.
Swets et al., "The Arena Product Family: Enterprise Modeling Solutions", Proceeding of the 2001 Winter Simulation Conference, IEEE, 2001, pp. 201-208.
Non-Final Office Action received for U.S. Appl. No. 17/726,716 dated Oct. 21, 2022, 76 pages.
Notice of Allowance received for U.S. Appl. No. 17/034,688 dated Apr. 13, 2023, 6 pages.
Decision to Grant a Patent received for European Patent Application Serial No. 21156811.8 dated Jul. 20, 2023, 2 pages.

* cited by examiner

AUGMENTED REALITY HUMAN MACHINE INTERFACE TESTING

CROSS-REFERENCE TO RELATED APPLICATIONS

This application is a continuation of, and claims priority to, U.S. patent application Ser. No. 16/791,107, filed on Feb. 14, 2020, and entitled "AUGMENTED REALITY HUMAN-MACHINE INTERFACE TESTING," the entirety of which is incorporated herein by reference.

BACKGROUND

The subject matter disclosed herein relates generally to industrial automation systems, and, more specifically, to industrial visualization systems.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for emulating an augmented reality human machine interface in a virtual reality environment is provided, comprising a simulation component configured to execute a simulation of an automation system under control of an emulated industrial control program based on a digital model of the automation system; a user interface component configured to render a virtual reality presentation of an industrial environment that includes the automation system, wherein the virtual reality presentation animates a three-dimensional virtual representation of the automation system in accordance with the simulation; and an augmented reality human-machine interface (HMI) component configured to execute an augmented reality HMI application and to overlay, in accordance with execution of the augmented reality HMI application, augmented reality data onto the virtual reality presentation based on user location and orientation data generated via user interaction with the virtual reality presentation, wherein the user location and orientation data indicates a simulated user location and orientation within the virtual reality presentation of the industrial environment.

Also, one or more embodiments provide a method for testing an augmented reality human-machine interface, comprising simulating, by a system comprising a processor, an industrial automation system under control of an emulated industrial control program based on a digital model of the industrial automation system; rendering, by the system, a virtual reality visualization of an industrial facility in which the industrial automation system operates, wherein the virtual reality visualization animates a three-dimensional virtual representation of the industrial automation system in accordance with the simulating; executing, by the system, an augmented reality human-machine interface (HMI) application; receiving, by the system, location and orientation data representing a simulated user location and orientation within the virtual reality visualization of the industrial facility; and layering, by the system, augmented reality data onto the virtual reality visualization based on the user location and orientation data and the executing of the augmented reality HMI application.

Also, according to one or more embodiments, a non-transitory computer-readable medium is provided having stored thereon instructions that, in response to execution, cause a system to perform operations, the operations comprising executing a simulation of an industrial automation system under control of an emulated industrial control program based on a digital model of the industrial automation system; rendering, based on the simulation, a virtual reality presentation of an industrial environment in which the industrial automation system operates, wherein the virtual reality presentation animates a three-dimensional virtual representation of the industrial automation system; executing an augmented reality human-machine interface (HMI) application; and layering augmented reality data onto the virtual reality presentation in accordance with the augmented reality HMI application and based on user location and orientation data representing a simulated user location and orientation within the virtual reality presentation of the industrial environment.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
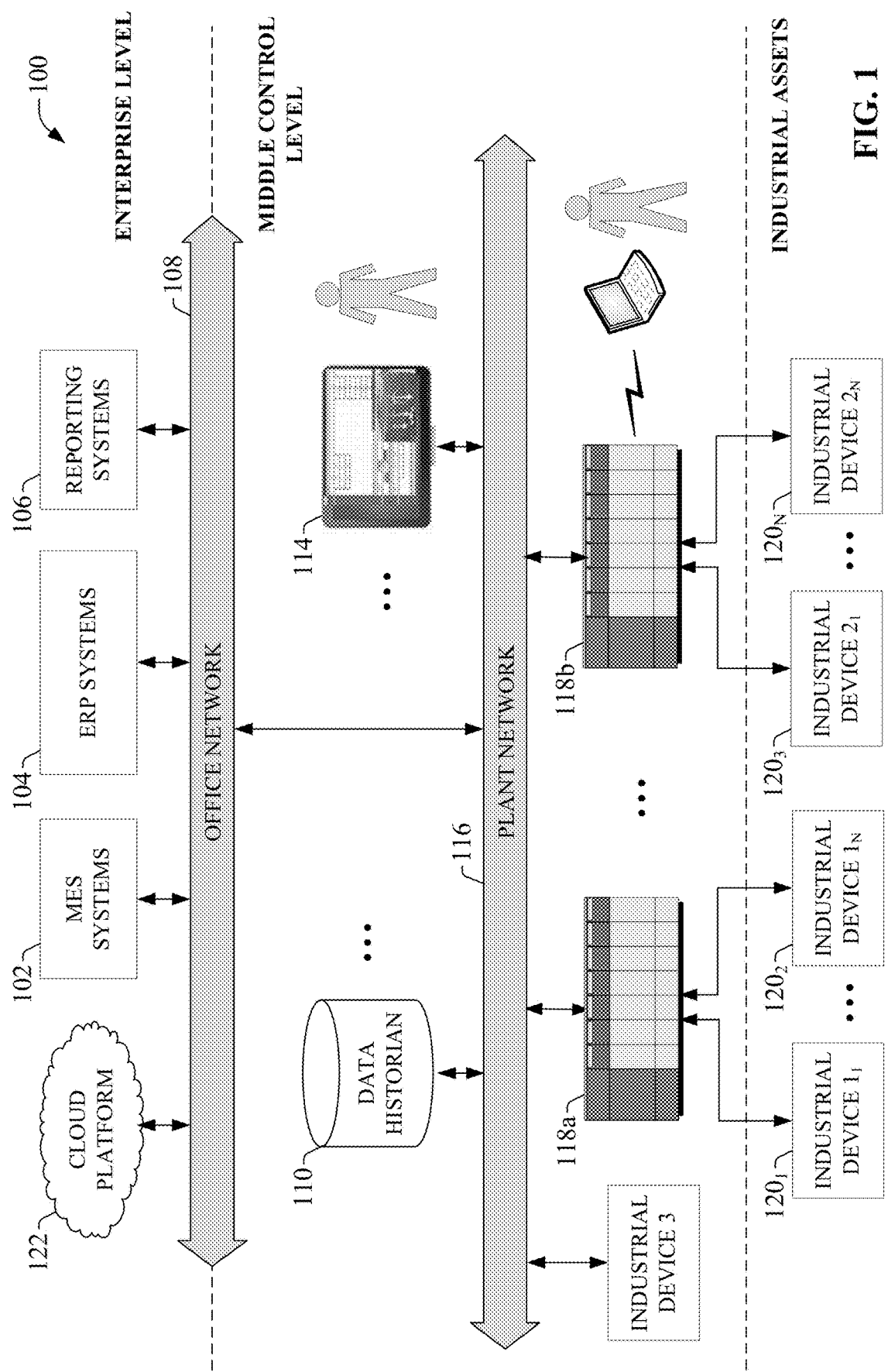
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

Although HMIs 114 can visualize useful status and operational information regarding operation of the industrial machines and processes executed within the industrial facility, users must be positioned near the HMIs 114 in order to view this information, and must understand how to navigate the graphical screens presented on the HMIs 114 in order to find desired information. Moreover, it may sometimes be difficult for an operator to correlate an item of data displayed on the HMI with the corresponding aspect of the industrial machine (e.g., the particular machine, subsystem, component, or device) to which the data relates. As an alternative to this approach for presenting operational and status information, an industrial augmented reality (AR) system can be used to generate augmented reality presentations to a user via a wearable computer or other type of client device. Such systems can execute AR HMI applications that deliver AR presentations to the user via the wearable appliance as the user traverses the industrial environment. These AR presentations can include graphical information overlays that are superimposed over the user's field of view of his or her surroundings, where the information presented to the user—as well as the location of the information within the user's field of view—is a function of the user's current location and orientation, from which is inferred the user's current field of view. With the user's field of view known, such AR HMIs can identify the machines or other industrial assets that are within this field of view and deliver data presentations for those assets to the wearable appliance. The AR system can continuously update the data items selected for display as part of the AR presentation, as well as the locations of these data items within the wearer's field of view, as a function of the user's changing location and orientation within the plant facility.

Figure 2:
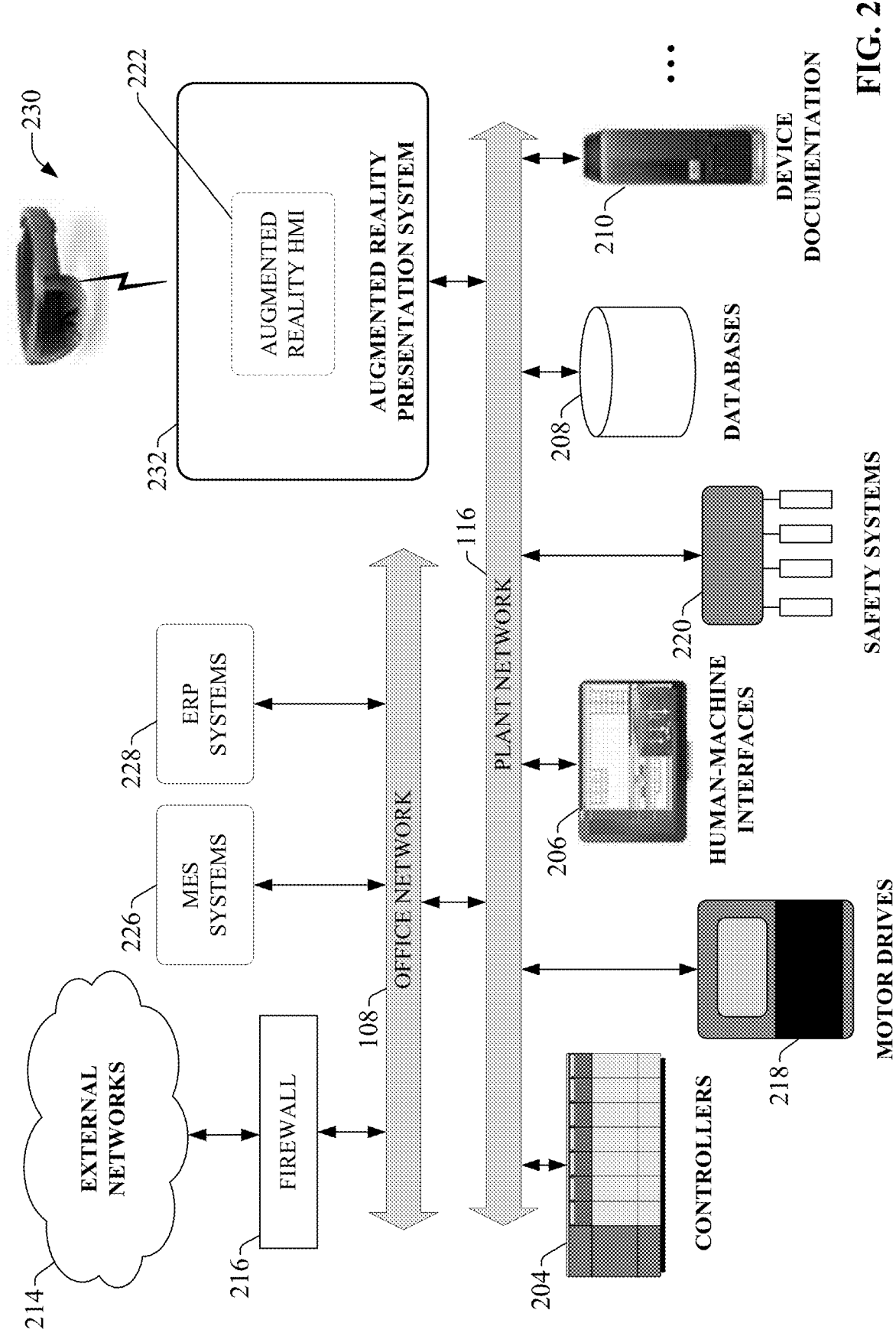
FIG. 2 is a block diagram of a generalized example architecture including an industrial augmented reality presentation system that renders augmented reality presentations of an industrial facility.

FIG. 2 is a block diagram of a generalized example architecture including an industrial AR presentation system 232 that renders augmented reality presentations of an industrial facility. The example industrial environment depicted in FIG. 2 includes one or more industrial controllers 204, HMIs 206, motor drives 218, industrial safety systems 220, databases 208 (e.g., data historians, employee databases, inventory databases, etc.), and device documentation repositories 210. The example industrial environment may also include other sources of industrial data not depicted in FIG. 2, including but not limited to quality systems (e.g., vision systems or other qualify verification systems), telemetry devices, presence sensors (e.g., photo detectors, optical scanners, proximity switches, etc.), video cameras, and other devices or sub-systems. In an example environment, these industrial devices and systems can reside on a plant (operational technology) network 116. In some scenarios, the industrial devices may be distributed across multiple plant networks 116 within the plant facility. The industrial environment may also include devices and systems residing on an office (information technology) network 108, including but not limited to manufacturing execution systems (MES) 226, enterprise resource planning (ERP) systems 228, business intelligence systems, business-level analytic systems, or other such assets. One or both of office network 108 or plant network 116 may also have access to external networks 214 such as the Internet (e.g., via firewall device 516).

AR presentation system 232—which resides on plant network 116 in the example architecture depicted in FIG. 2, but which may also reside on office network 108, on an external network, on a web server, or on a cloud platform as a cloud-based service provider—collects data from the diverse set of industrial devices via network 116. In some configurations, the AR presentation system 232 can also collect selected items of plant data from one or more devices or systems on office network 108, including but not limited to the MES system 526, ERP system 528, business intelligence systems, or other such assets. AR presentation system 232 formats the data for presentation and superimposes selected subsets of the collected and formatted industrial data on the augmented reality presentations on or near graphical representations of the industrial asset (e.g., machine, control cabinet, industrial controller, etc.) to which the data relates. The selection of data items to be collected by the AR presentation system 232, the formatting of those data items, and the rendering locations of the data items within the user's field of view (via the wearable appliance 230) relative to relevant industrial assets are defined by the AR HMI application 222 executed by the presentation system 232.

In some embodiments the augmented reality presentations can also be customized in accordance with a defined role of the wearer of appliance 230, as specified in user profiles defined for each user of the system. Example user roles that can determine how AR data is presented to a user can include, but are not limited to, line operators, maintenance personnel, plant managers, plant engineers, or other roles.

Presentation system 232 can deliver these presentations to a wearable appliance 230 worn by a user at the plant facility. In some embodiments, presentation system 232 can be implemented on a web server, allowing wearable appliance 230 to invoke AR presentations via an Internet connection. The presentation system 232 may also be implemented on a networked local server accessible by the wearable appliance 230 via a wireless network connection. In yet another scenario, presentation system 232 may be implemented on a cloud platform, where the presentation system 232 executes as a cloud-based service. Also, in some embodiments, rather than being implemented on a separate device or platform from the wearable appliance 230, the AR presentation system 232 and associated AR HMI application 222 can execute on the wearable appliance 230 itself.

In some embodiments, the data items to be collected by the AR presentation system 232 for delivery to wearable appliance 230 can be defined by the AR HMI application 222 in terms of data tag names that identify data tags on industrial controllers, HMIs, data historians, or other industrial devices; name and location information for data files to be collected (e.g., work order data files, device documentation files, inventory files, etc.); or other such data identifiers. The collected data items can include telemetry and status information relating to operation of the devices or their associated industrial automation systems, as well as configuration information for the industrial devices (e.g., motor drive parameters, industrial controller communication settings, I/O modules installed on each industrial controller, etc.), any of which can be rendered on the wearable appliance 230 as overlaid augmented reality information. From the office network 108 or external networks 214, the collected data can include, but is not limited to, work management information, production line scheduling information, operator work schedule information, product or material inventory information, etc.

Wearable appliance 230 can interface with AR presentation system 232 via a wired or wireless network interface, a near-field communication interface, or other such device interface suitable for the particular platform on which the presentation system 232 is implemented. In some embodiments, AR presentation system 232 may include security components configured to verify an authorization of the wearable appliance 230 to access the presentation system 232 prior to allowing AR presentations to be delivered to the wearable appliance 230. For example, the presentation system 232 may authenticate the wearable appliance 230 or its owner using password verification, biometric identification (e.g., retinal scan information collected from the user by the wearable appliance 230 and submitted to the system 232), cross-referencing an identifier of the wearable appliance 230 with a set of known authorized devices, or other such verification techniques.

Figure 3:
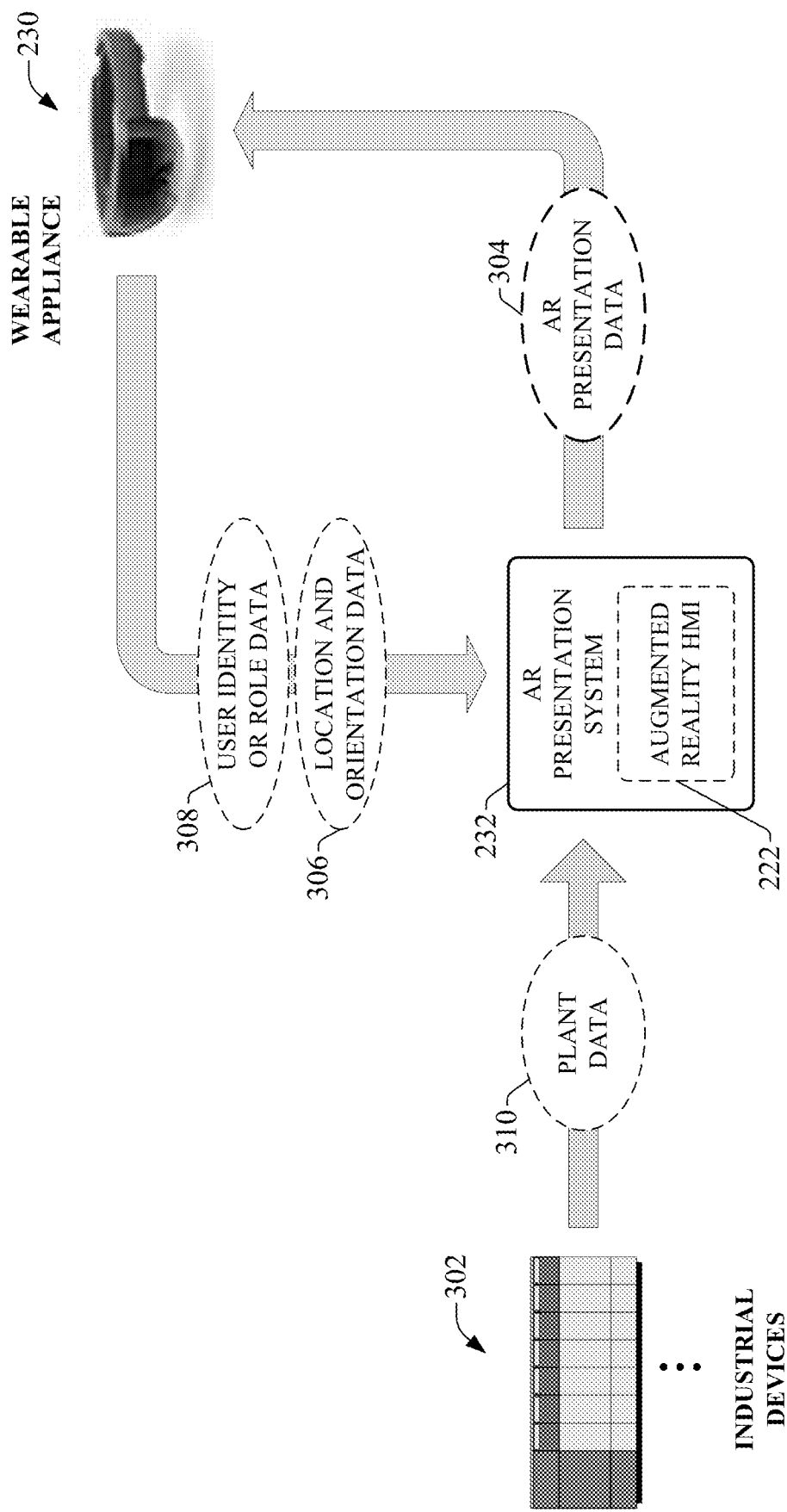
FIG. 3 is a diagram illustrating data inputs leveraged by an example augmented reality presentation system to generate industrial AR presentations.

An industrial AR presentation can be generated based on a combination of diverse information received and processed by the AR presentation system 232 in accordance with the AR HMI application 222. FIG. 3 is a diagram illustrating data inputs leveraged by an example AR presentation system 232 to generate industrial AR presentations. As noted above, presentation system 232 collects plant data 310 from industrial devices or systems 302 across the plant environment. AR presentation system 232 can also receive location and orientation data 306 from the wearable appliance 230 indicating the appliance's current location within the plant and orientation. In an example architecture, location and orientation components of the wearable appliance 230 can be configured to determine a current geographical location of the appliance 230. In some embodiments, the wearable appliance 230 can leverage global positioning system (GPS) technology to determine the wearer's absolute location, or may be configured to exchange data with positioning sensors located within the plant facility in order to determine the user's relative location within the plant. The wearable appliance 230 can also include orientation sensing components that measure the wearable appliance's current orientation in terms of the direction of the appliance's line of site, the angle of the appliance relative to horizontal, etc. Other types of sensors or algorithms can be supported by embodiments of the wearable appliance 230 for determining a wearer's current location and orientation, including but not limited to inertial measurement units (IMUs) or visual-inertial odometry (VIO). The wearable appliance can then report the obtained location and orientation information to the AR presentation system 232 as location and orientation data 306.

Based on the location and orientation data 306 indicating the appliance's current location and line of sight as well as a selected subset of the plant data 310 corresponding to the user's field of view (inferred based on the location and orientation data 306), AR presentation system 232 generates and delivers augmented reality presentation data 304 to wearable appliance 230. Presentation data 304, when received and executed by wearable appliance 230, renders an augmented reality information presentation on the wearable appliance's display appropriate to the user's current field of view. In an example scenario, as a user is viewing an automation system, machine, or industrial device through wearable appliance 230 (or as a substantially real-time video image rendered on the wearable appliance 230 or other type of client device), the AR presentation system 232 can monitor the location and orientation data 306 to determine the user's location relative to the automation system, the user's current line of sight or field of view, and/or other contextual information indicative of the user's relationship to the automation system. In some embodiments, AR presentation system 232 can determine which industrial assets are within the user's current field of view by cross-referencing the current location and orientation data 306 with a plant model that defines the identities, locations, and physical properties of the industrial assets within the plant environment. This plant model may be stored on the presentation system 232 either as part of AR HMI application 222 or as a separate component that is referenced by the AR HMI application 222 in order to determine which industrial assets are currently within the user's line of sight.

Based on the determined identity of the automation system currently being viewed by the user, the AR presentation system 232 can identify a subset of the plant data 310 representing current status information for devices and/or machines that make up the automation system, or for a process being carried out by the automation system. The system 232 can then generate augmented reality presentation data 304 and deliver this presentation data 304 to the wearable appliance 230; e.g., as graphical or text-based indicators overlaid on the user's field of view, such that each indicator is positioned near the machine or device to which the indicator pertains. Presentation system 232 can render, as part of an AR presentation, subsets of plant data 310, calculated production or machine statistics, or alphanumeric message as overlaid information placed on or near the user's view of corresponding industrial assets (e.g., control cabinets, machines, control devices, motors drives, valves, tanks, etc.) to which the information relates. For example, if the user's current view encompasses a motor-driven conveyor and a motor drive that controls the motor, the presentation system 232 may superimpose a current operating status of the motor drive (e.g., a current speed, a fault condition, an operating mode, etc.) near the view of the motor drive as perceived by the user. If the user is currently viewing a die-cast furnace, the presentation system 232 may superimpose a current furnace temperature near the view of the furnace. Information superimposed on the user's field of view can comprise relevant items of plant data 310 or calculated values obtained by processing selected items of the plant data 310.

In some embodiments, the content or formatting of the information presented as part of an AR presentation can also be a function of the role of the wearer of appliance 230 (e.g., operator, maintenance personnel, plant manager, engineer, etc.). Accordingly, in some embodiments wearable appliance 230 can also provide user identity or role data 308 to the AR presentation system 232, which sets the content and formatting of the user's AR presentation data 304 accordingly. In this way, AR presentation system 232 can deliver role-specific presentations that render selected information known to be relevant to the recipient's role. For example, if the user identity or role data 308 indicates an operator role, presentation system 232 may present machine-level operating statistics for a machine currently being viewed by the operator (e.g., operating mode, alarm conditions, etc.) while omitting lower level engineering or maintenance data. Similarly, if the user identity or role data 308 indicates a maintenance role, system 232 may present device-level information (e.g., selected motor drive configuration or status information, breaker statuses, voltages, etc.) that may be useful in connection with troubleshooting performance issues.

The selections of which data items are to be superimposed onto the user's view for a given industrial asset, as well as the locations of these data items relative to the location of the asset within the user's field of view, can be defined by the AR HMI application 222. In general, the AR HMI application 222 defines the content, formatting, and placement of overlaid AR information as a function of the user's visual perspective. AR HMI application 222 can also define various user roles and the user presentations (in terms of content and formatting) to be associated with each of the defined roles.

When a new automation system is being designed and built for eventual commissioning within a plant facility, the system design and development process includes development of the HMI applications (e.g., HMIs 114) that will be used to visualize system information to operators and maintenance personnel. Since these HMIs define links or references to selected data items available on industrial controllers 118 or other industrial devices, it may not be possible or practical to test and debug a provisional HMI application until the physical automation system has been installed at the plant facility, or has otherwise been built and supplied with power (e.g., at an original equipment manufacturer's facility). Testing and debugging an augmented reality HMI application 222 can be more involved and time-consuming than conventional HMIs, since designers must not only verify that the correct items of plant data 310 (or calculated values obtained by processing selected items of plant data 310) have been linked to the presentation, but must also verify that these data items correctly match the user's current field of view and are positioned at locations within the field of view that do not obstruct the user's view of crucial elements of the physical world.

The necessity to defer testing of an AR HMI application 222 until after the physical automation system has been commissioned can add considerable delay to the system start-up, since potentially lengthy testing and debugging of the augmented reality HMI application 222 can only begin after installation of the physical system is complete, and may consequently delay the time at which the new automation system can be placed in service.

To address these and other issues, one or more embodiments described herein provide an industrial virtual reality (VR) system that supports testing and debugging of an AR HMI application within a virtual representation of the plant environment. This approach can yield an interactable AR HMI that simulates, within the VR environment, what a wearer of an AR appliance will see while traversing the physical plant. In this way, proper operation of the AR HMI can be verified prior to commissioning of the physical system (e.g., in parallel with design or installation of the physical system). This testing and debugging can involve ensuring that graphics are tied to the correct data points, confirming correct and non-obtrusive locations of graphics within the user's field of view, etc.

Figure 4:
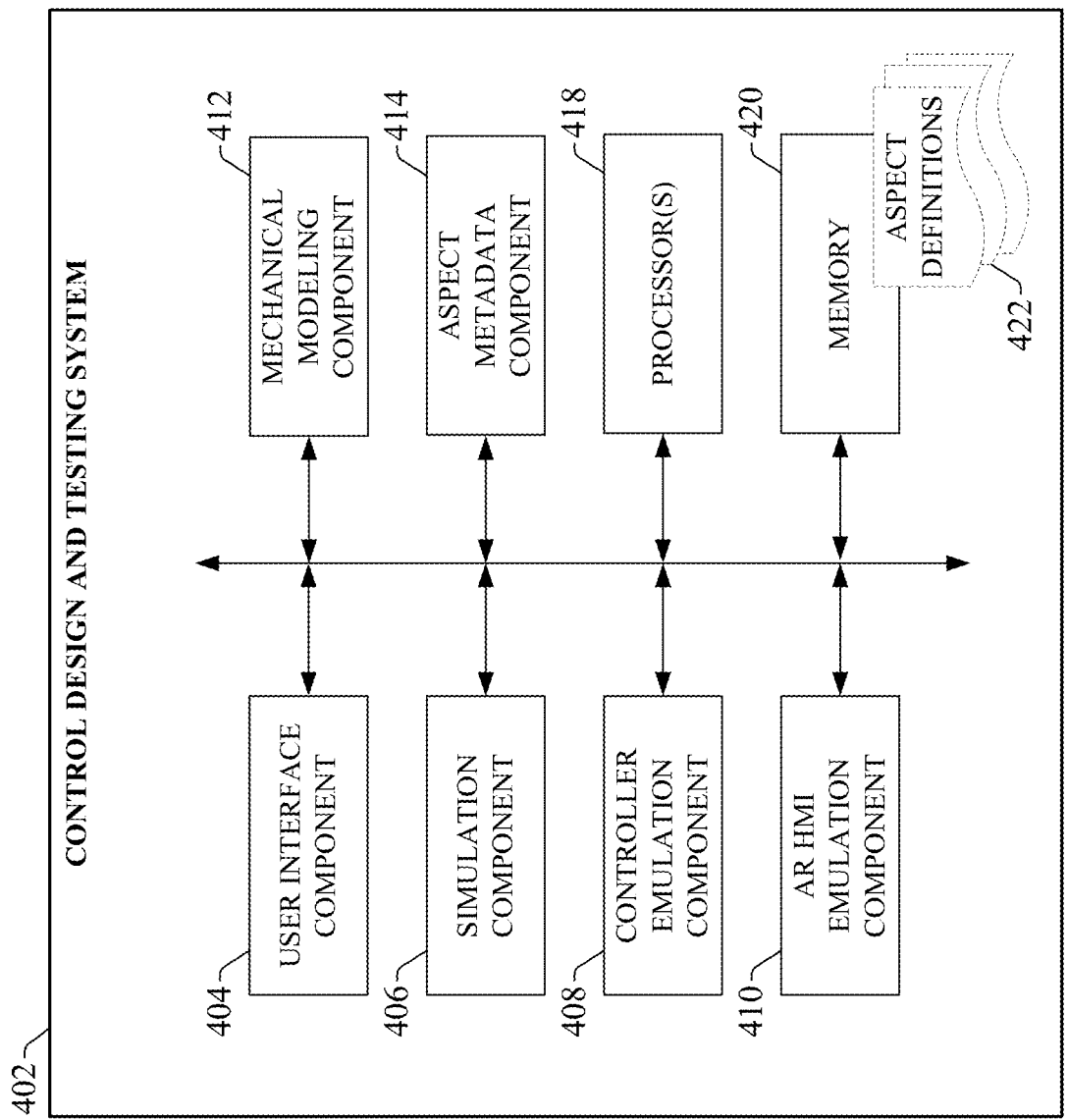
FIG. 4 is a block diagram of an example industrial control design and testing system that supports testing of augmented reality HMIs within a virtual reality representation of an automation system or industrial environment.

FIG. 4 is a block diagram of an example industrial control design and testing system 402 that supports testing of AR HMIs within a virtual reality representation of an automation system or industrial environment according to one or more embodiments of this disclosure. Although the virtual testing of AR HMIs is described herein within the context of a particular control design and testing system 402 used to design, simulate, and test an automation system within a virtualized environment, the approach described herein for performing virtualized testing and debugging of an AR HMI is not limited to use within such design and testing systems, but rather can be implemented within other types of industrial VR systems without departing from the scope of one or more embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Control design and testing system 402 can include a user interface component 404, a simulation component 406, a controller emulation component 408, an AR HMI emulation component 410, a mechanical modeling component 412, an aspect metadata component 414, one or more processors 418, and memory 420. In various embodiments, one or more of the user interface component 404, simulation component 406, controller emulation component 408, AR HMI emulation component 410, mechanical modeling component 412, aspect metadata component 414, the one or more processors 418, and memory 420 can be electrically and/or communicatively coupled to one another to perform one or more of the functions of the Control design and testing system 402. In some embodiments, components 404, 406, 408, 410, 412, and 414 can comprise software instructions stored on memory 420 and executed by processor(s) 418. Control design and testing system 402 may also interact with other hardware and/or software components not depicted in FIG. 4. For example, processor(s) 418 may interact with one or more external user interface devices, such as a keyboard, a mouse, a display monitor, a touchscreen, or other such interface devices.

User interface component 404 can be configured to receive user input and to render output to a user in any suitable format (e.g., visual, audio, tactile, etc.). In some embodiments, user interface component 404 can render interactive display screens on a display device (e.g., a display device associated with a desktop computer, a laptop computer, a tablet computer, a smart phone, etc.), where the display screens serve as the interface for a control design and/or simulation platform. The user interface can display virtual reality three-dimensional (3D) simulations of automation systems being tested against an emulated industrial control program, render operational statistics representing expected performance of the automation system based on the simulation, and other such information. User interface component 404 can also be configured to overlay or layer augmented reality data onto the 3D VR simulation environment in accordance with an emulated AR HMI application being tested against the simulated plant environment. In some embodiments, the user interface component 404 can also render selectable design tools and receive design input via interaction with the tools in connection with configuring aspects for the industrial automation system (e.g., I/O connectivity between devices of the virtual system and an industrial controller). Design tools made available by the user interface component 404 can include a set of automation aspects that can be selectively associated with mechanical elements or components of the automation system being designed. The aspects made available for selection are based on aspect definitions 422 maintained on the memory 420, which define the available aspects as well as associated simulation data for the respective aspects which can be used by a simulation platform to simulate operations or behaviors of the aspects within the context of an industrial simulation.

Simulation component 406 can be configured to simulate operation of a virtualized model of an industrial automation system under control of an industrial control program. Controller emulation component 408 can be configured to emulate execution of an industrial control program being testing on a virtualized (or emulated) industrial controller. AR HMI emulation component 410 can be configured to emulate execution of an augmented reality HMI application in conjunction with the simulation of the virtualized model of the automation system.

Mechanical modeling component 412 can be configured to generate a three-dimensional mechanical model of an automation system or machine based on design input provided by a user via user interface component 404. Aspect metadata component 414 can be configured to assign aspect metadata to selected elements of the mechanical model in accordance with design input received from the user. As will be described in more detail herein, the aspect metadata labels the selected elements as being particular types of industrial components or machines (e.g., a joint of a particular type, a motor, a sensor, a conveyor, etc.), or as having a particular physics geometry or behavior. Aspect metadata assigned to a given element is drawn from one or more of the aspect definitions 422 corresponding to respective one or more aspects assigned to the element. Adding this aspect metadata to the mechanical model can yield an enhanced mechanical model (e.g., a dynamic digital twin) of the automation system that can be executed within a simulation platform to mimic the behavior of the automation system under control of an industrial control program.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

As noted above, the systems and methods for emulating an AR HMI within a virtual reality representation of an industrial environment for the purposes of testing and debugging the HMI, or for the purposes of training plant personnel, can be incorporated into substantially any type of industrial simulation or VR system capable of executing a virtual 3D simulation of an automation system or industrial environment. The following description and associated drawings describe an example control design and testing system 402 within which the AR HMI emulation functionality can be integrated. However, it is to be appreciated that the functionality of the AR HMI emulation component 410 is not limited to use within the particular control design and testing system 402 described herein, but rather can also be incorporated into other types of industrial 3D simulation systems without departing from the scope of one or more embodiments of this disclosure.

Figure 5:
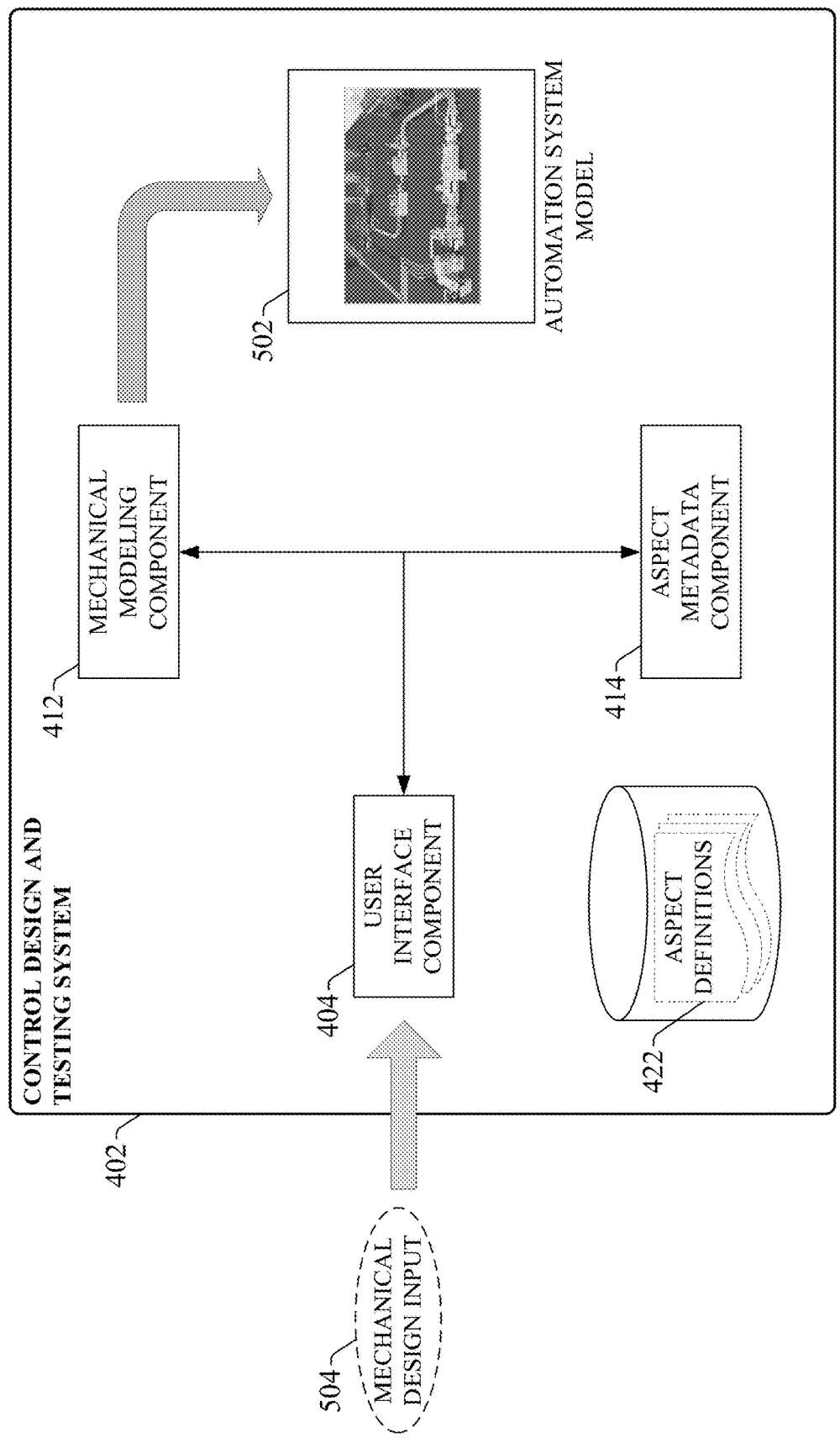
FIG. 5 is a diagram illustrating creation of a mechanical model of an industrial automation system using a control design and testing system.

FIG. 5 is a diagram illustrating creation of a mechanical model of an industrial automation system using control design and testing system 402. In some embodiments, control design and testing system 402 may execute on a client device, such as a desktop computer, a laptop computer, a tablet computer, a mobile device, a wearable AR/VR appliance, etc. In other embodiments, control design and testing system 202 may execute on a cloud platform or another high-level platform accessible to multiple users having authorization to access the system 402. In such embodiments, a client device can remotely access the control design and testing system's design tools and leverage these tools to develop a simulation-capable mechanical model of an automation system being designed.

User interface component 404 can render graphical interface displays via the client device's display hardware. Through interaction with these interface displays, the user can submit mechanical design input 504 specifying mechanical aspects of the automation system being designed. For example, mechanical design input 504 can specify three-dimensional shapes representing mechanical structures or devices to be included in the mechanical design. These shapes can graphically represent such industrial assets as industrial robots, conveyors, tooling machines, motors, motor drives, sensors, piping, conduit, platforms, safety gates and fences, control cabinets, or other such assets. The mechanical design input 504 can also specify the locations and orientations of these graphical representations relative to one another, physical connections between the mechanical elements, or other such mechanical properties and relationships. Mechanical modeling component 412 generates a 3D automation system model 502 representing the automation system (e.g., a machine assembly, a production line, etc.) in accordance with the graphical representations and their relationships defined by the mechanical design input 504.

Mechanical design input 504 can be submitted via user interface component 404 in any suitable format according to various embodiments. For example, the graphical interface displays rendered by user interface component 404 can comprise a workspace or canvas on which the automation system model 502 is rendered, as well as associated toolbars from which the user can select 2D or 3D drawing tools or pre-defined shapes or components for inclusion in the model 502. In some embodiments, shapes representing mechanical components can be dragged into the main workspace from the toolbar, or otherwise added to the workspace for placement and orientation within the model 502. Shapes or collections of shapes within the workspace can be manipulated via interaction with the graphical interface. For example, a designer can interact with selected shapes, collections of shapes, or the model 502 as a whole to rotate, link, or relocate shapes within virtual three-dimensional space. In some embodiments, additions or modifications to the automation system model 502 are stored within a CAD file representing the model 502 (e.g., a part or assembly file).

Mechanical design input 504 may also comprise a computer-aided design (CAD) model developed in a separate CAD platform and representing one or more mechanical structures or devices to be included in the automation system. In this regard, one or more CAD models representing respective different subsets of the automation system being designed can be imported into the control design and testing system 402 for inclusion into the larger automation system model 502. Such CAD models may comprise three-dimensional graphical representations of such industrial assets as industrial robots, conveyors, tooling machines, motors, motor drives, sensors, piping, conduit, platforms, safety gates and fences, control cabinets, or other such assets. If a CAD model represents an assembly of components, the model may also specify the locations and orientations of these graphical representations relative to one another, physical connections between the mechanical elements, or other such mechanical properties and relationships. Once imported, the designer can incorporate the CAD model into the greater automation system model 502.

Figure 6:
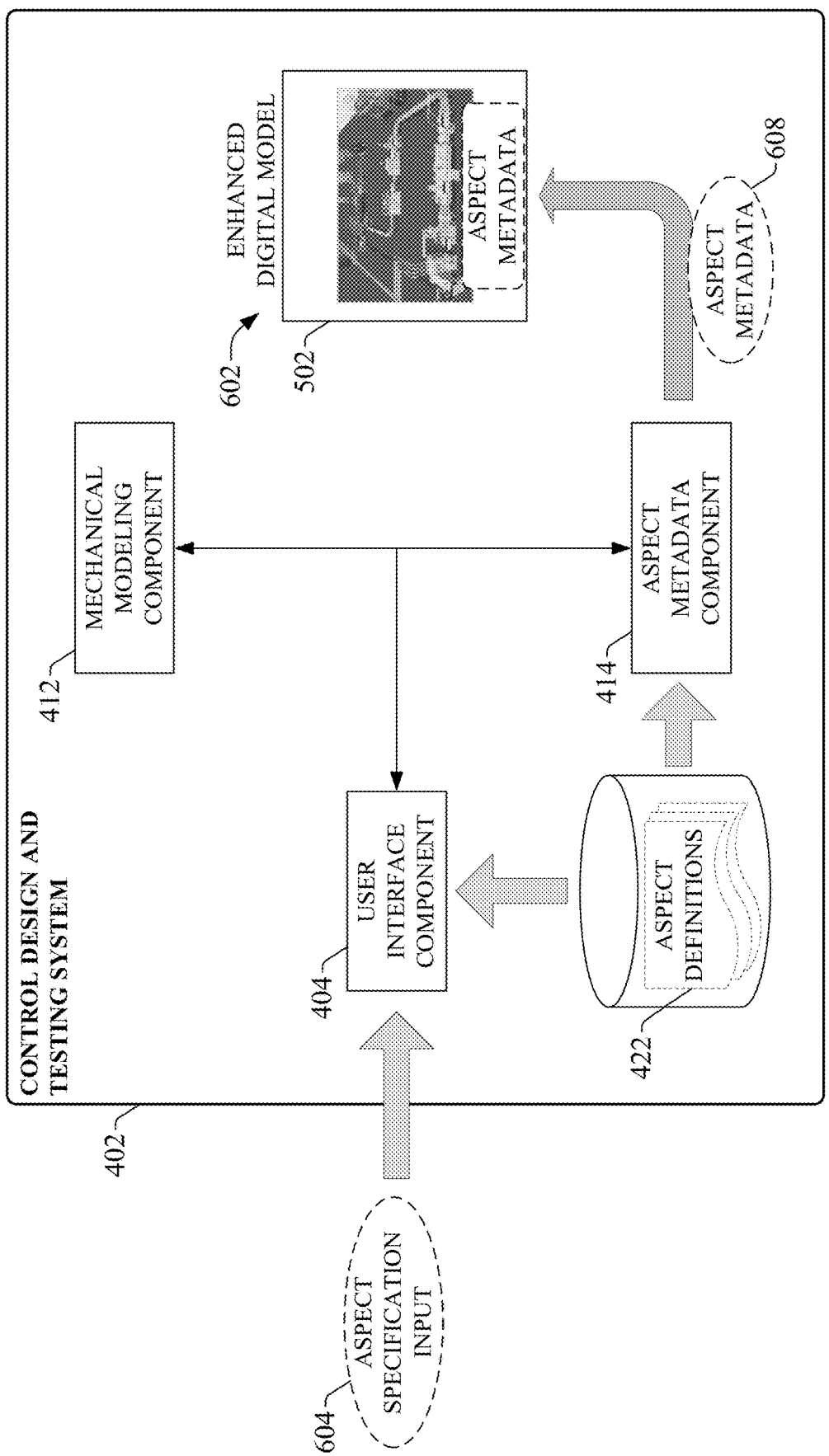
FIG. 6 is a diagram illustrating the addition of aspect metadata to an automation system model.

Typically, a mechanical CAD model is essentially only a three-dimensional technical drawing suitable for use as a guide for building and installing the automation system but without simulation capabilities. In some embodiments, control design and testing system 402 can include an aspect metadata component 414 that allows the user to enhance the automation system model 502—including any integrated CAD models—with aspect metadata that transforms the automation system model 502 to a simulation-capable digital model of the automation system (or components thereof) that can be executed within a simulation platform to mimic operation of the system. FIG. 6 is a diagram illustrating the addition of aspect metadata 608 to the automation system model 502. In one or more embodiments, the graphical interface displays rendered by user interface component 404 can include one or more toolbars for adding aspect metadata to selected elements or components of the model 502 of the automation system. The aspects made available for selection are based on the aspect definitions 422 stored on the system 402 (e.g., on memory 420).

Each aspect definition 422 defines a set of physical, kinematic, or mechatronic properties that dictate how that aspect behaves within a simulation environment. The properties defined by an aspect definition 422 substantially mirror physical behaviors and characteristics of the corresponding physical aspect in the real world. Control design and testing system 402 classifies the aspect definitions 422 according to the type of mechanical element, control element, or device for which the physical properties are defined. The aspect toolbar rendered by the user interface component 404 lists the available aspects according to these classifications for selection by the user. Example aspects that can be selected and applied to the automation system model 502 include, but are not limited to, various types of dynamic or kinematic joints (e.g., slider joints, revolute joints, robot arm joints, hinges, etc.), movement surfaces such as conveyors, motors, grippers (e.g., suction grippers, mechanical grippers, etc.), sensors, pneumatic or hydraulic actuators (e.g., pusher arms, stoppers, etc.), rollers, or other such elements of the mechanical system.

The catalog of aspect definitions 422 can also include various types of robotic end effectors (e.g., mechanical grippers, suction grippers, etc.). End effector aspect definitions 422 can define physical properties (e.g., 3D physics constraints) for their corresponding gripper types, which can be used on the control simulation side to more accurately mimic operation of a robot's part handling behavior at a low level of abstraction. For example, a suction gripper aspect applied to a representation of a robot defined in the model 502 may indicate to a simulation platform that the robot's end effector is to be modeled as a suction gripper, whereby products in proximity of the suction gripper can be assumed to have been gripped by the robot (via suction), and can subsequently be moved in tandem with the robot arm to simulate movement of the part by the robot. By contrast, a mechanical gripper aspect may imply more complicated physics involved with movement of a part by the gripper. In the case of a mechanical gripper aspect, constraints of a physics engine may be used to determine whether the sides of the gripper are touching respective sides of a product at a proper location and angle before allowing the part to move in tandem with movement of the robot (due to friction between the gripper arms and the product surfaces).

Some aspect definitions 422 may also define physics geometries or properties that can be associated with selected elements of the automation system model 502. Aspects can also designate selected machines defined within the model 502 as being load creators that introduce products having a designated shape and physical behavior (e.g., collision physics) into the automation system; e.g., via a conveyor that feeds the system.

The process of adding aspect metadata 608 to the automation system model 502 involves labeling selected mechanical components or devices represented by the mechanical model 502 as being one of the available control aspects (represented by one of the aspect definitions 422). This aspect labeling workflow can be performed by submitting aspect specification input 604 via interaction with the graphical interface displays rendered by user interface component 404. For example, a user may select, as an aspect, a type of robot joint from the aspect toolbar and subsequently select an element of the automation system model 502 to be labeled as this type of joint. In response to these selections, aspect metadata component 414 associates the aspect metadata 608 for the selected type of robot joint with the indicated component of the automation system model 502, thereby transforming the static mechanical representation of the joint to an active virtual control element whose behavior can be virtually simulated within a simulation platform. The aspect metadata 608 assigned to the selected mechanical component is drawn from the aspect definition 422 corresponding to the indicated type of aspect.

Aspect metadata 608 can define substantially any type of information that can be recognized and leveraged by a simulation platform to accurately model the runtime movement or behavior of the corresponding mechanical component in response to control inputs or simulated forces.

Figure 7:
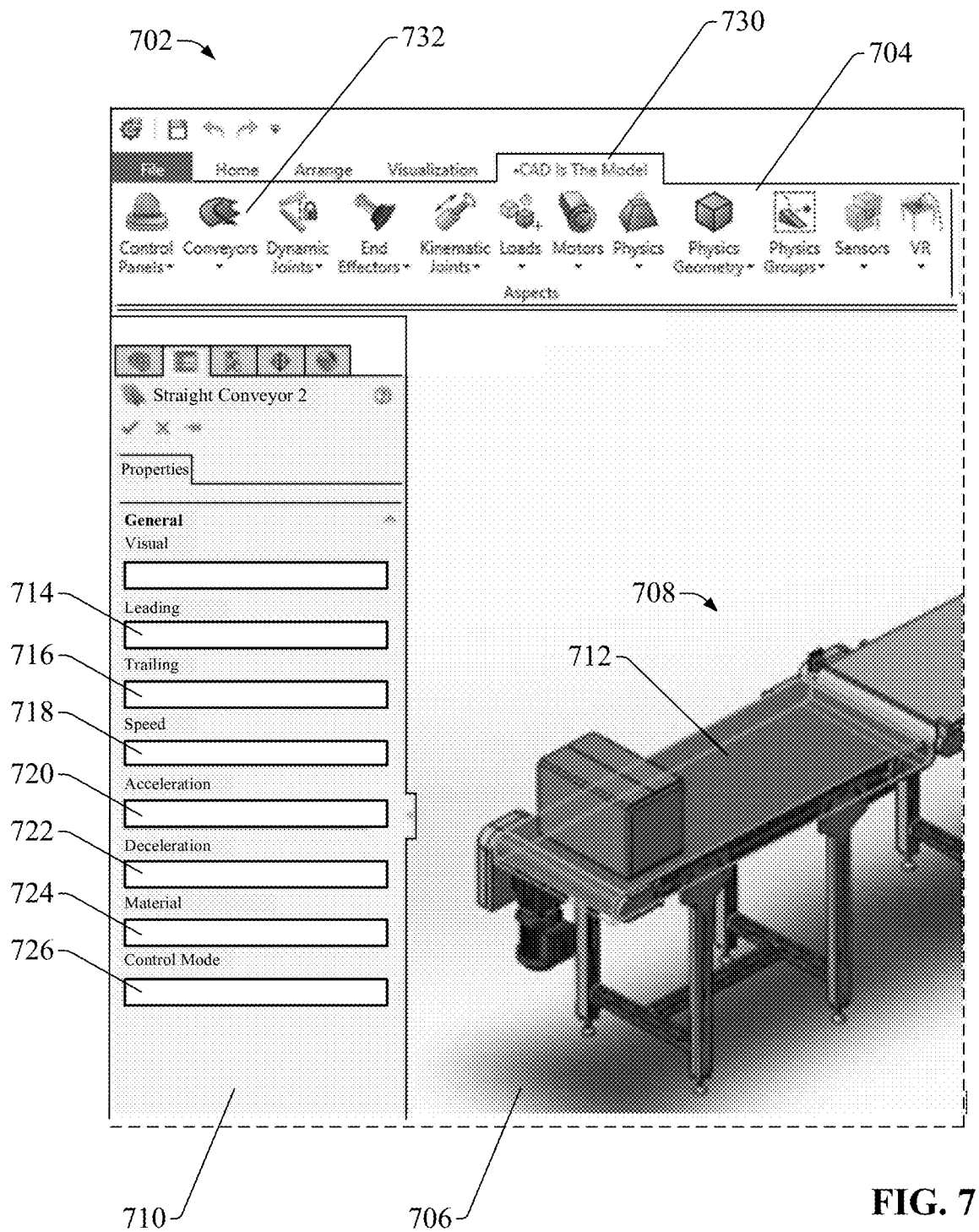
FIG. 7 is an example interface display that can be rendered by a user interface component and used to assign aspect metadata to an automation system model.

Depending on the aspect, the aspect metadata 608 may comprise default fixed values or properties that are globally applicable to all instances of that aspect, as well as user-defined metadata that can be customized by the user to conform to the specifics of the user's system. FIG. 7 is an example interface display 702 that can be rendered by the user interface component 404 and used to assign aspect metadata 608 to an automation system model 502. In this example, interface display 702 comprises a main workspace 706 on which is rendered a 3D CAD representation 708 of the automation system model 502 of an automation system being designed. Interface display 702 can render an aspect toolbar 704 above the main workspace 706 in response to selection of a control aspect tab 730. Aspect toolbar 704 displays a number of selectable options representing control aspects—or categories of aspects—that can be selected and added to the model via interaction with the CAD representation 708 (e.g., control panels, conveyors, dynamic joints, end effectors, kinematic joints, loads, motors, physics, physics geometry, physics groups, sensors, etc.).

In the example depicted in FIG. 7, a portion of the CAD representation 708 representing a conveyor 712 is to be labeled as with a "straight conveyor" aspect, identifying this component of the model 502 as a conveyor and associating simulation metadata with the representation of the conveyor 712 which can be leveraged by a separate simulation platform to accurately simulate the behavior of the conveyor 712. To assign this aspect, a user can interact with the interface display 702 to select a "straight conveyor" option from the Conveyor's drop-down selection 732 in the aspect toolbar 704, then select the representation of the conveyor 712 in the CAD representation 708 (the visualization of the automation system model 502). In response to these selections an aspect metadata panel is rendered to the left of the main workspace 706 listing a number of fields 714-728 for entering user-definable metadata values. These user-definable metadata values are in addition to the fixed, global aspect metadata values associated with the "straight conveyor" aspect, which are also associated with the conveyor 712.

In general, the list of available user-definable aspect metadata values rendered by the user interface component 404 is based on the particular aspect selected. In this way, when a user assigns an aspect to a component of the model 502, user interface component 404 prompts the user to enter values of any user-defined metadata fields that may be available for that selected aspect. In the illustrated example, user-definable aspect metadata 608 for a conveyor can include definitions for a leading edge 714 and a trailing edge 716 of the conveyor 712, which may be automatically identified by aspect metadata component 414 based on the shape of the mechanical conveyor representation to which the conveyor aspect is assigned, or may be explicitly identified by the user (e.g., by selecting the leading and trailing edges to indicate their locations). Additionally, the user interface component 404 may prompt the user to input such user-definable conveyor aspect metadata values as a running speed 718, an acceleration 720, or a deceleration 722 of the conveyor. The user may also be prompted to specify a material 724 of the belt used to convey products along the conveyor, which may impact the simulated traversal of products along the conveyor based on frictional coefficients or other physical properties of the material. A control mode 726 for the conveyor 712 may also be requested (e.g., on-off control, variable speed control, etc.).

Workflows and graphical interfaces similar to that illustrated FIG. 7 can be used to assign selected aspect metadata to other types of automation system components. According to another example, aspect metadata 608 for a pneumatic pusher arm may define a direction of linear movement of the pusher arm within the three-dimensional coordinate system of the automation system model 502, a start position, and a range of movement. User interface component 404 may also prompt the user to provide user-defined metadata values for the velocity of the pusher's movement when actuated.

Some aspect definitions 422 (and corresponding aspect metadata 608 drawn from these definitions 422) may also define physical characteristics or constraints of selected mechanical components, and these characteristics and constraints can subsequently be referenced by a simulation platform to accurately simulate the movement and behaviors of the components. These characteristics can include, but are not limited to, gear diameters, gear ratios, coefficients of friction, inertias, motion constraints (e.g., known axes of motion of a particular type of robot and their corresponding motion constraints), or other such data. Depending on the type of aspect, some of these aspect metadata values may be user-defined, while others may be fixed global characteristics that are expected to be applicable to all instances of the aspect. Some aspect definitions 422 may also define executable scripts that can be executed by a separate simulation platform and applied to an associated element of the model 502 (e.g., an element labeled with the corresponding aspect by the user), causing the element to mimic the behavior of its corresponding physical component within the simulation environment.

Some aspect definitions 422 may also specify control I/O interfacing for their corresponding assets. For example, assigning aspect metadata 608 for a sensor (e.g., a photo-eye, a proximity switch, etc.) to a selected element of the automation system model 502 representing a sensor can designate the selected element as a digital input device that provides a digital input value to an industrial controller in response to detection of an object within a detection range of the sensor. In this scenario, the detection range may be a user-defined aspect metadata value. In another example, aspect metadata 608 for a type of pusher arm may specify that the arm requires a digital controller output to control the advanced and retracted states of the pusher arm (e.g., ON for advanced and OFF for retracted), as well as two digital inputs to read the states of respective two proximity switches at the extreme ends of travel of the pusher arm to detect when the arm is in the fully advanced or fully retracted state. In general, aspect definitions 422 for system components having known or expected I/O interfacing to an industrial controller can define the inputs and/or outputs (analog and digital) required to monitor and/or control these system components. This I/O information can facilitate connectivity between the enhanced digital model 602 and an emulated controller when the model 602 is ready to be simulated within a simulation and testing platform.

Figure 8:
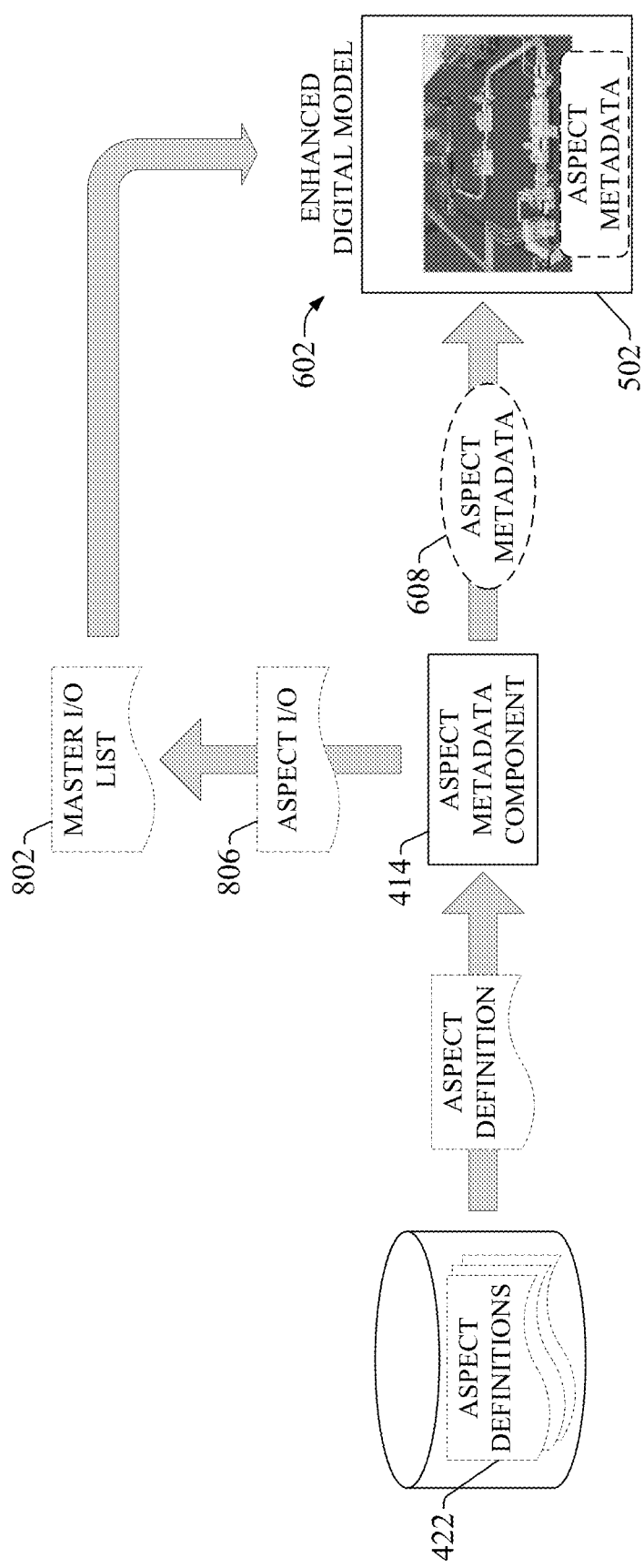
FIG. 8 is a diagram illustrating creation of a master I/O list for an automation system project based on assignment of aspect metadata to an automation system model.

Moreover, in some embodiments, when aspects having associated I/O definitions are added to the automation system model 502, aspect metadata component 414 can automatically populate an aggregate list of system I/O with the I/O points defined by the corresponding aspect definitions 422. FIG. 8 is a diagram illustrating creation of a master I/O list 802 for an automation system project based on assignment of aspect metadata 608 to the automation system model 502. When an aspect is selectively assigned to an element of the model 502 as described above, the aspect metadata component 414 determines whether the aspect definition 422 corresponding to the aspect defines inputs or outputs for the aspect. In addition to assigning the aspect metadata 608 to the model 502, any aspect I/O 806 defined in the aspect definition 422 is added to a master I/O list 802 for the automation system. This master I/O list 802 can be rendered in a human-readable format and referenced by the controls engineers in connection with designing the control system and associated control logic. For example, the master I/O list 802 can populate a tag browser within a simulation platform that allows a user to selectively associate the virtual machine I/O with respective controller I/O points.

In some embodiments, the master I/O list 802 can be integrated with or otherwise stored with the enhanced digital model 602 of the automation system, such that the I/O list 802 travels with the model 602. Thus, the enhanced digital model 602 includes not only the 3D layout of the new system but also the I/O map for the entire system. This master I/O list 802 can be generated before design of the control system begins in accordance with the designated aspect metadata 608, providing controls engineers with a useful design constraint (namely, the I/O required to operate the automation system).

Some aspect metadata 608 can also designate components of the automation system model 502 as load sources, which introduce discrete items of product (e.g., boxes, luggage, manufactured parts, fluid material, or other such product) into the system. When a load source aspect label is applied to an element of the model 502, user interface component 404 can prompt the user to provide user-defined operating parameters for the designated load source, such as a rate at which products are introduced to the system, a shape of the products (e.g., boxes or cylinders having specified dimensions, items made of a flexible material and having random variable shapes, etc.), collision physics associated with the products, or other such characteristics. When the enhanced digital model 602 is subsequently imported into a simulation platform, the simulation platform simulates release of product items by the labeled load source in accordance with the load source aspect metadata 608.

Figure 9:
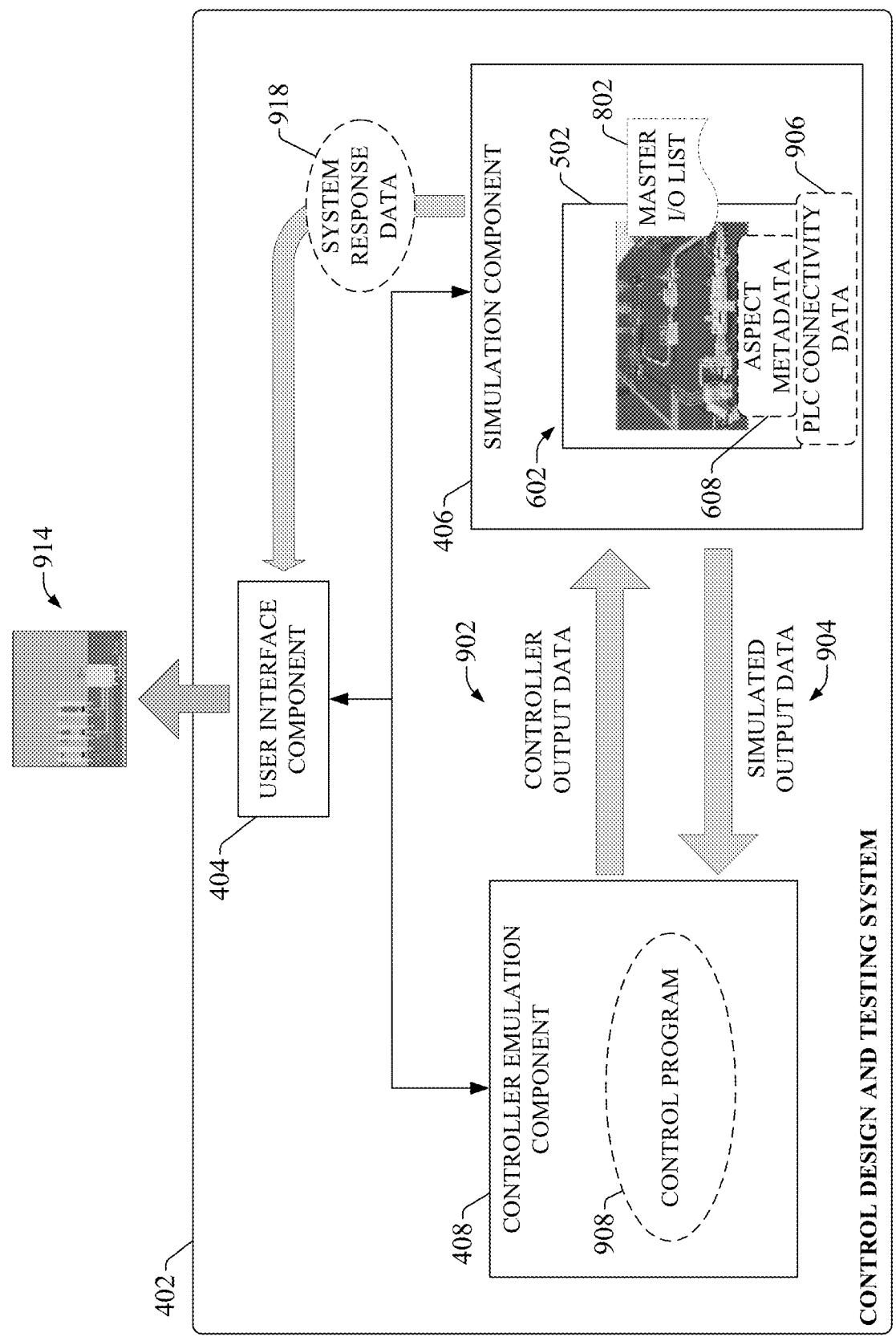
FIG. 9 is a diagram illustrating simulation of the combined mechanical and control designs within the control design and testing system using an enhanced digital model to virtually mimic the behavior of a physical automation system under control of a control program.

Marking up the automation system model 502 with aspect metadata 608 as described above yields an enhanced digital model 602 of the automation system being designed, which can be executed in a 3D simulation platform for virtual commissioning. In the present example, control design and testing system 402 comprises a controller emulation component 408 that emulates execution of an industrial control program being testing on a virtualized (or emulated) industrial controller, and a simulation component 406 that simulates operation of a virtualized model of an industrial automation system under control of the industrial control program. Within the control design and testing system 402, the enhanced digital model 602 of the automation system—comprising the automation system model 502 augmented with aspect metadata 608 and master I/O list 802—can be interfaced with control programming (e.g., ladder logic) being developed for the automation system to yield a virtual testing environment that allows both the mechanical and control designs to be virtually simulated and tested before finalizing the overall design and proceeding to the building and installation phase. FIG. 9 is a diagram illustrating simulation of the combined mechanical and control designs within the control design and testing system 402 using the enhanced digital model 602 to virtually mimic the behavior of the physical automation system under control of a control program 908. The aspect metadata 608 applied to selected elements of the automation system model 502 as described above causes those elements to be recognized by the testing platform's simulation component 406 as control or activation elements, and instructs the simulation component 406 as to how each element behaves within a simulation context in response to control and physical stimuli.

Since the enhanced digital model 602 models mechanical characteristics of the automation system as well as behavioral properties of components that make up the model (by virtue of the aspect metadata 608), the enhanced digital model 602 can be used to simulate expected operation and behavior of the automation system while under control of an emulated control program 908. This can include viewing and verifying the simulated system's responses to control inputs in terms of movement, speeds, flows, temperatures, fill levels, movement of product through the system, etc. In the example depicted in FIG. 9, controller emulation component 408 of the testing system 402 acts as an industrial controller emulator to execute control program 908, which is being developed and tested against the virtual model 602 of the automation system. Although FIG. 9 depicts only a single control program 908 being emulated against a virtual 3D model 602 of an automation system, the simulation platform can also be used to simulate a virtual model 602 of entire industrial facility, which may involve emulation of multiple control programs 908 that execute throughout the facility.

Simulation component 406 can leverage the mechanical characteristics and associated aspect metadata 608 encoded in the enhanced digital model 602 to simulate operational aspects of the automation system to be monitored and regulated by the control program 908. To achieve this, a user (e.g., a controls engineer) can virtually interface control program 908 with the enhanced digital model 602 to facilitate exchange of simulated I/O data between the program 908 and the digital model 602, thereby simulating real-world control and operation of the automation system. To this end, the developer can use the testing platform's configuration tools (e.g., a tag browser) to selectively map controller I/O defined by the control program 908 to the I/O of the active control elements of the enhanced digital model 602 (that is, the control elements labeled with aspect metadata 608 designating these elements as having associated inputs and outputs available to be interfaced with an industrial controller's I/O, as documented by the master I/O list 802). In an example scenario, the controls engineer may define the PLC tags and I/O addresses that drive a motor, actuator, or other component defined in the automation system model 502, and selectively link the tags and associated I/O addresses to the I/O points defined for the modeled component. This I/O mapping between the control program 908 and the digital model 602, which is part of the overall automation system design, can be stored in an appropriately formatted file (e.g., a spreadsheet or another type of file) as PLC connectivity data 906 and integrated with the digital model 602. Thus, the digital model 602 maintains this aspect of the control design in addition to the mechanical design aspects.

Control program 908 can comprise any conceivable type of code used to process input signals read into a controller and to control output signals from the controller—including but not limited to ladder logic, sequential function charts, function block diagrams, or structured text—and is designed to regulate the automation system being modeled by digital model 602. During simulation, simulation component 406 generates digital and analog I/O values representing, for example, sensor outputs, metering outputs, or other plant data analogous to the data expected to be generated by the physical system based on the static and dynamic characteristics of the physical system represented by the digital model 602. This simulated output data 904 is provided to the controller emulation component 408 executing control program 908, which receives this data 904 as one or more virtual physical inputs. Control program 908 processes these inputs according to user-defined algorithms and generates digital and/or analog controller output data 902 based on the processing. This output data 902 represents the physical outputs that would be generated by a controller executing control program 908 and transmitted to the hardwired field devices comprising the automation system (e.g., PID loop control outputs, solenoid energizing outputs, motor control outputs, actuator control outputs, robot control outputs, etc.). The controller output data 902 is provided to the appropriate input points of the digital model 602 in accordance with the user-defined I/O mapping.

In addition to generating simulated output data 904, simulation component 406 also generates system response data 918 based on analysis of the simulated data exchange and expected behaviors of the modeled automation system in response to the simulated controller output data 902. The simulation component 406 estimates and simulates the virtual automation system's responses to the emulated controller outputs (and the timings of these outputs) based on the behavioral and physical properties and constraints defined by the aspect metadata 608 associated with respective control elements of the automation system model 502. For example, based on the mechanical and behavioral characteristics of the industrial components modeled by the enhanced digital model 602 (e.g., conveyors, industrial robots, machines, simulated products, etc.), as represented by the aspect metadata 608, simulation component 406 can predict expected behaviors of the modeled industrial components—as well as behaviors of products being manufactured, processed, or handled by the components—in response to the controller output data 902, and convey this predicted behavior as system response data 918. Example behaviors represented by system response data 918 can include, but are not limited to, movements and trajectories of industrial robots, movement of product through the simulated automation system (including speeds, accelerations, locations, lags, collisions, gripper failures, etc.), flow rates of fluids through the system, expected energy consumption by the system, an expected rate of degradation of mechanical components of the system (based in part on coefficient of friction information defined in the enhanced digital model 602), expected forces applied to respective components of the system during operation, or other such behaviors.

In the case of industrial robots having end effectors that are used to grip and move items of product (e.g., to stack or palletize items of product, to move items from one conveyor to another, etc.), the simulated interactions between these robots and the products can depend in part on the type of gripper aspect metadata 608 associated with the robot's end effector. For example, as noted above, suction gripper aspect metadata 608 may indicate to the simulation component 406 that products in proximity of the suction gripper can be assumed to have been gripped by the robot provided the suction effector is properly aligned above the part, and can subsequently be moved with the robot arm to simulate movement of the part by the robot until the part is released. Alternatively, mechanical gripper aspect metadata 608 may define more involved physics to be considered by the simulation component 406 before it can be assumed that the part has been securely gripped by the robot. This may include determining whether the two arms of the gripper are touching respective sides of the product, and at the proper angles or orientations, when the effector is in the gripped position before allowing the product to move in tandem with the robot. Since secure gripping of the product by a mechanical gripper depends on proper alignment of the product upon entering the picking station from which the robot grips the part, as well as the relative alignment between the product and the robot's gripper at the time of pick-up, the simulation component 406 can assess these factors during the simulation to determine whether the product has been properly gripped, or alternatively whether a mis-grip is likely to occur due to misalignment. Instructions regarding how to properly assess this gripping behavior can be provided by the mechanical gripper aspect metadata 608 assigned to the robot.

As noted above, one or more components of the automation system model 502 can be labeled with aspect metadata 608 designating those components as load sources. Based on this load source aspect metadata, the simulation component 406 can recognize these components of the model as load sources that introduce product (e.g., manufactured parts, boxes, bottles, fluid material, etc.) into the automation system under test, and animate these components to simulate the release of product in accordance with the metadata. Default and user-defined metadata parameters assigned to these components can define a frequency at which the product is released, a type of product (e.g., discrete solid items or liquid material), a shape of the product (e.g., boxes having specified dimensions, spherical objects, items having random amorphous shapes due to the flexible material of which the items are made, etc.), a speed at which the product traverses the system, etc. Movement of these products through the simulated automation system may also be a function of the conveyor aspect metadata associated with the conveyor representations across which the product moves (e.g., the speed of the conveyor, the material of the belt used to convey the product, etc.). The simulation component 406 can also simulate predicted collisions between items of products, or between products and machinery (e.g., collisions with a pusher arm or robot arm due to a mis-timed control sequence). Repercussions of these collisions can be predicted and simulated based on physics rules and geometries modeled in part by the aspect metadata 608. Simulation component 406 can also leverage physics rules defined by the aspect metadata 608 to determine whether a mechanical gripper has properly gripped an item of product, or is likely to drop some or all items of product due to improper gripping.

User interface component 404 can generate a visualization 914 that renders results of the simulation on a client device. Visualization 914 can render a 3D graphical representation of the automation system based on the enhanced digital model 602, and animate this graphical representation based on the system response data 918 and/or other calculated statistics relating to the simulation session, yielding a three-dimensional visual presentation of the automation system in operation. This simulation technique can be used to test and debug control programs without putting field equipment and machinery at risk, to test modifications to machine operations and estimate how such modifications affect certain key performance indicators or financial metrics, to facilitate training of new plant personnel within the context of an interactive virtual reality representation of the plant environment, or to perform other such functions.

In scenarios in which an augmented reality HMI is to be used by plant personnel to render operational, status, and/or statistical data for industrial assets via a wearable appliance (as described above in connection with FIGS. 2 and 3), it is necessary to test and debug the AR HMI application prior to deployment to ensure that the correct items of plant data are linked to the AR presentation under the appropriate circumstances (as a function of the wearer's location and orientation data 306 and, if applicable, user identity or role data 308), and to ensure that the data overlays are positioned within the wearer's field of view at suitable locations; e.g., such that the data items are located sufficiently near the user's view of the corresponding industrial assets and do not obscure the user's view of critical system components or otherwise hinder the user's visibility in an unsafe manner.

Figure 10:
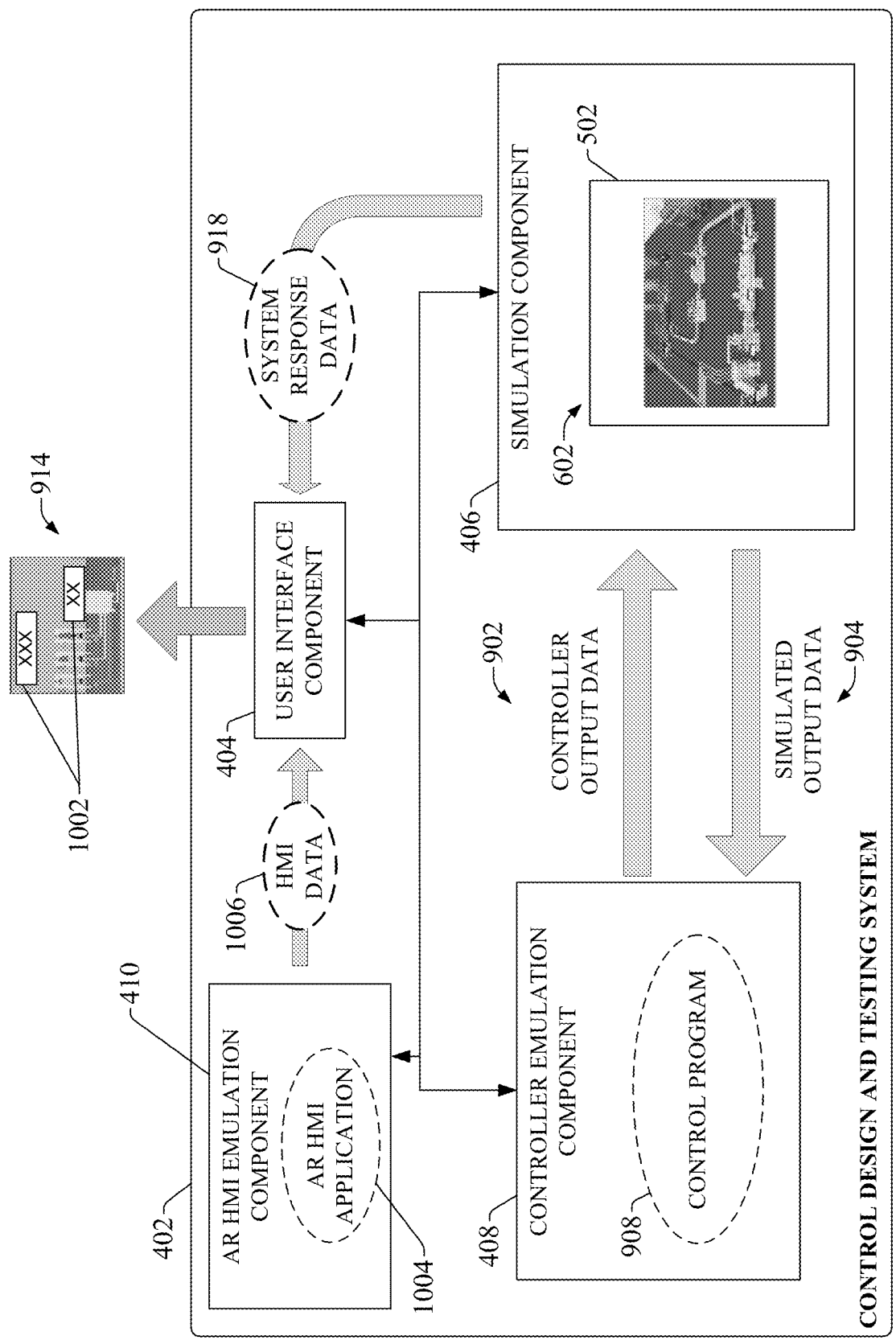
FIG. 10 is a diagram illustrating an example configuration in which a control design and testing system includes an integrated augmented reality HMI emulation component for virtually commissioning an augmented reality HMI application prior to deployment in the field.

To facilitate testing and debugging of an AR HMI application prior to commissioning of the physical automation system (or to otherwise test an AR HMI application without the need to be physically present at the industrial facility), an AR HMI emulation component 410 can be integrated as part of an industrial virtual reality platform, such as control design and testing system 402 or other suitable industrial VR platforms. FIG. 10 is a diagram illustrating an example configuration in which control design and testing system 402 includes an integrated AR HMI emulation component 410 for virtually commissioning an AR HMI application 1004 prior to deployment in the field. AR HMI emulation component 410 can be configured to execute an AR HMI application 1004 to be tested against a VR simulation of the physical industrial system or plant environment. In this example embodiment, the visualization 914 generated by user interface component 404 is a 3D virtual reality presentation that can be navigated in accordance with navigation inputs entered by the user via a client device on which the VR visualization is rendered. The VR visualization 914 is generated and animated based on the simulation-capable digital model 602 of the industrial system or plant environment as controlled by the emulated control program 908 (or multiple emulated control programs 908 in the case of a virtualization of a plant environment comprising multiple independently controlled machines or processes), as well as the user's navigational inputs representing a traversal through the virtualized plant environment.

In addition, the user can install an AR HMI application 1004 to be emulated by the AR HMI emulation component 410 in conjunction with the industrial VR simulation. The AR HMI application 1004 can be the same application that will subsequently be executed in the field (e.g., on an AR presentation system 232 or similar AR visualization system) for creation and delivery of AR presentations to wearable appliances 230 within the physical plant facility. Once installed, AR HMI emulation component 410 can execute the application 1004 synchronously with virtual simulation of the automation system by the simulation component 406, and generate AR HMI data 1006 in accordance with the application 1004. User interface component 404 can merge this AR HMI data 1006 with the VR simulation data (e.g., system response data 918) generated by the simulation component 406 to yield an aggregate visualization 914 comprising a 3D virtual reality rendering of the physical industrial environment on which AR data items 1002 are overlaid. These overlaid AR data items correspond to the data items that will be overlaid onto the user's field of view via a wearable appliance 230, as defined by the AR HMI application 1004. The locations of these overlaid data items within the virtualized presentation are also defined by the AR HMI application 1004 and correspond to the locations at which a wearer of a wearable appliance 230 will see these items while in the field.

Figure 11:
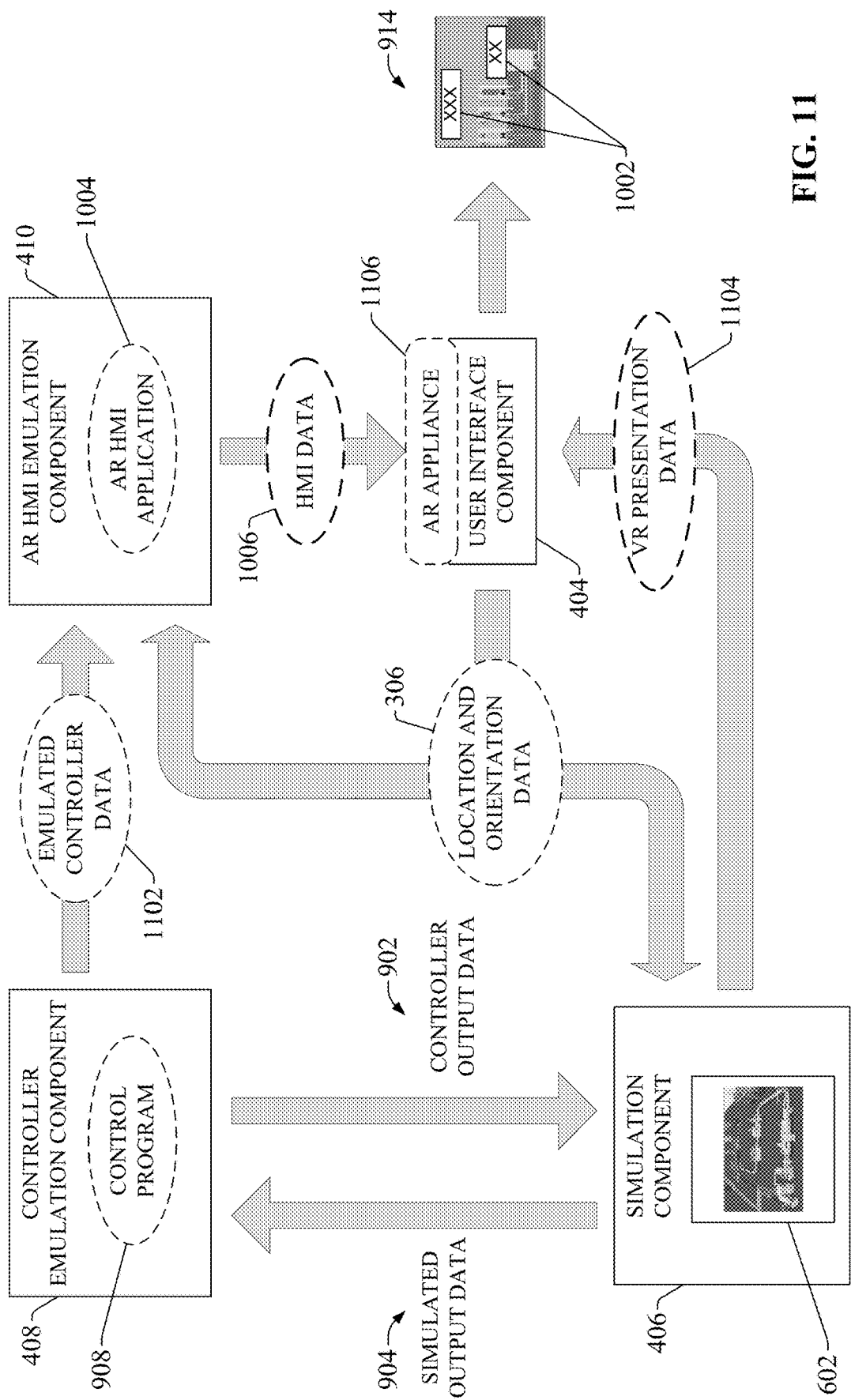
FIG. 11 is a diagram illustrating example data flows for creation of an enhanced industrial virtual reality presentation that includes emulated augmented reality data overlays.

FIG. 11 is a diagram illustrating example data flows for creation of an enhanced industrial VR presentation that includes emulated AR data overlays according to one or more embodiments. In this example, simulation component 406 and controller emulation component 408 interact as described above to facilitate simulation of the automation system—or collection of systems that make up a larger plant environment—modeled by the digital model 602 as controlled by execution of the control program 908. Control program 908 may be a new program being tested and debugged within the virtual simulation prior to commissioning of the physical automation system, or may be a copy of a control program that is already in service and being used to control the corresponding physical automation system. Based on the digital model 602 of the automation system, the exchange of controller output data 902 and simulated output data 904 between the simulation component 406 and the controller emulation component 408, and simulated location and orientation data 306 submitted by the user via the user interface component 404, simulation component 406 provides VR presentation data 1104 to the user interface component 404 that graphically represents the state of the simulated automation system as well as a current simulated user perspective within the virtualized industrial environment. User interface component 404 translates this VR presentation data 1104 to a VR visualization 914, which is delivered to a client device.

User interface component 404 allows the user to update the current user perspective of the VR visualization 914 by submitting updated location and orientation data 306 that changes one or both of a simulated location or a simulated orientation of the user within the virtual industrial environment, causing the simulation component 406 to update the perspective of the 3D visualization 914 accordingly. These interactions simulate the user's traversal through the physical plant environment. The user can update the location and orientation data 306 via any suitable interaction with the visualization 914 in various embodiments, including but not limited to mouse-based navigation, joystick-based navigation, navigation using a control pad, or other such means. During this simulated traversal though the industrial environment, the simulation component 406 continues to simulate operation of the industrial assets modeled by the digital model 602 in accordance with the mechanical properties of the digital model 602, the aspect metadata 608, and emulated execution of the control program(s) 908.

During this simulation, AR HMI emulation component 410 executes an AR HMI application 1004 to be tested within the context of the virtual industrial environment. To this end, controller emulation component 408 provides emulated controller data 1102 to the AR HMI emulation component 410 during execution of the simulation. This emulated controller data 1102 represents virtualized inputs from the industrial system automation that are analogous to digital and analog inputs from the physical automation system that will be provided to the actual AR HMI system in the field. Emulated controller data 1102 can include, for example, values of virtual controller tags set by the control program 908, virtualized telemetry data (e.g., pressures, temperatures, flows, etc.), virtual alarms, or other such data that may be used by the AR HMI application 1004 in connection with generating augmented reality presentations.

Based on this emulated controller data 1102 and the virtual location and orientation data 306 representing the user's virtual location and orientation within the simulated 3D environment, AR HMI emulation component 410 generates AR HMI data 1006, which is layered onto the visualization 914 by the user interface component 404 as AR data items 1002. The resulting composite visualization, which layers AR information within a VR environment, emulates the user's view of the plant environment through a wearable appliance 230 that interfaces with the AR HMI application 1004. In this regard, the user interface component 404 can execute a virtualized wearable AR appliance 1106 that processes the HMI data 1006 in a manner similar to processing by an actual wearable AR appliance 230, but translates the AR presentation for display on the 3D VR visualization 914 (which may be rendered on a flat 2D screen of the receiving client device in contrast to the real-world AR scenario) rather than on a physical wearable appliance 230. The virtual AR appliance 1106 translates or converts the HMI data 1006 to AR data items 1002 that are overlaid on the current user perspective of the virtual industrial environment depicted by the visualization 914, such that the selection of which data items 1002 are rendered and the locations of these data items 1002 within the virtualized field of view accurately emulate the arrangement of AR data that the user would see in the physical environment through an actual wearable appliance 230 given the analogous user location and orientation. User interface component 404 updates these data overlays 1002 in real-time as the user interacts with the virtual 3D visualization 914 (e.g., by adjusting the location and orientation data 306 to simulate traversal through the environment).

Figure 12:
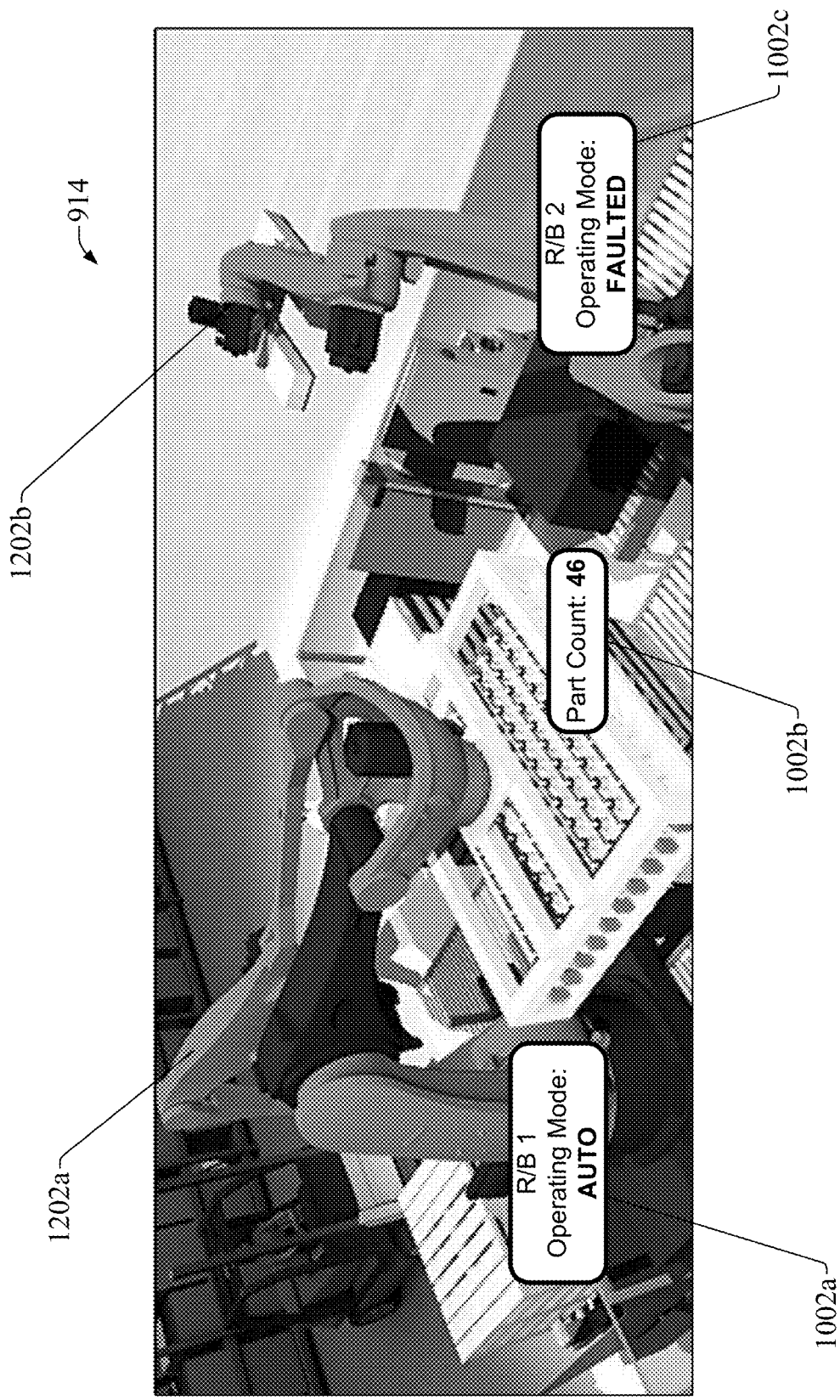
FIG. 12 is a snapshot of an example virtual 3D presentation of an industrial environment on which an augmented reality presentation has been layered.

FIG. 12 is a snapshot of an example virtual 3D visualization 914 of an industrial environment on which an AR presentation has been layered by the AR HMI emulation component 410 and user interface component 404. In this example, an automation system comprises two industrial robots 1202a and 1202b. Simulation component 406 can simulate the behavior of the two robots 1202a, 1202b and other industrial assets within the field of view, and visualization 914 can render a corresponding animation of these assets that reflects the simulated behavior. The current perspective of the virtual environment is a function of the user's current virtual location and orientation within the simulated environment, as reflected by location and orientation data 306.

During the simulation, AR HMI emulation component 410 executes an AR HMI application 1004 being tested, using emulated controller data 1102 as simulated inputs from the virtualized automation system. Based on the user's current simulated location/orientation and the emulated controller data 1102, the AR HMI emulation component 410 generates AR HMI data 1006, which is translated by the virtual AR appliance 1106 and rendered as overlaid data items 1002a-1002b onto the VR visualization 914 by the user interface component 404. The particular data items 1002a-1002b rendered at a given time, and their locations within the simulated field of view relative to their corresponding industrial assets, are defined by the AR HMI application 1004. Using this approach, the user can visually confirm that the correct AR information is being presented for a given view of the automation system, and that the locations of this information is satisfactory (e.g., that a given item of data is positioned sufficiently near its corresponding industrial asset or machine, and that the data item does not obscure the user's view of critical system components or impair the user's visibility in an unsafe manner). If necessary, the user can implement successive modifications to the AR HMI application 1004 to correct perceived problems with the AR presentations until the AR presentation behaves as desired. Thus, the AR HMI can be thoroughly tested and debugged within the virtual environment without the need to be physically present at the physical automation system (e.g., before the automation system has been commissioned), and without the need for an actual wearable AR appliance. Once debugged, the AR HMI application 1004 can be deployed in the field (e.g., executed on an augmented reality presentation system 232 or similar visualization system) for delivery of industrial AR presentations to wearable appliances 230.

In addition to testing and debugging, this system can also be used as a training platform to train new plant personnel. In this regard, trainees can interact with the virtualized plant environment to gain preliminary experience with the automation system within a virtualized environment. Overlaying augmented reality information onto this virtualized environment using the same AR HMI application that will be executing in the field can accurately emulate the perspective that will be presented to the user during real-world interactions with the automation system, yielding a high-fidelity training environment.

In addition to the features discussed above, some embodiments of simulation component 406 can be configured to incorporate human avatars into the VR training environment to simulate the presence of personnel who are likely to be required to operate a machine, automation system, or production line represented by model 602. In an example scenario, the digital model 602 can define, as part of its automation system definition, locations at which personnel are expected to be required in order to properly monitor and operate the automation system. These human locations can be specified by a designer and defined in the model 602 in some embodiments. Alternatively, the simulation component 406 can be configured to infer a suitable number and locations of operators for reliable and safe operation of the automation system based on analysis of the model 602. With these human avatars included as part of the simulation, a user interacting with the VR training environment as described above can communicate, interact, and exchange objects with these other avatars. In the context of training and testing, these avatars can also help a system designer to determine whether provisional operator locations are likely to cause operational or safety issues. For example, a user of the VR simulation can make a judgment as to whether an operator at a particular station will impede another operator's line of sight to an important machine information, such as a stacklight or other notification device.

Figure 13:
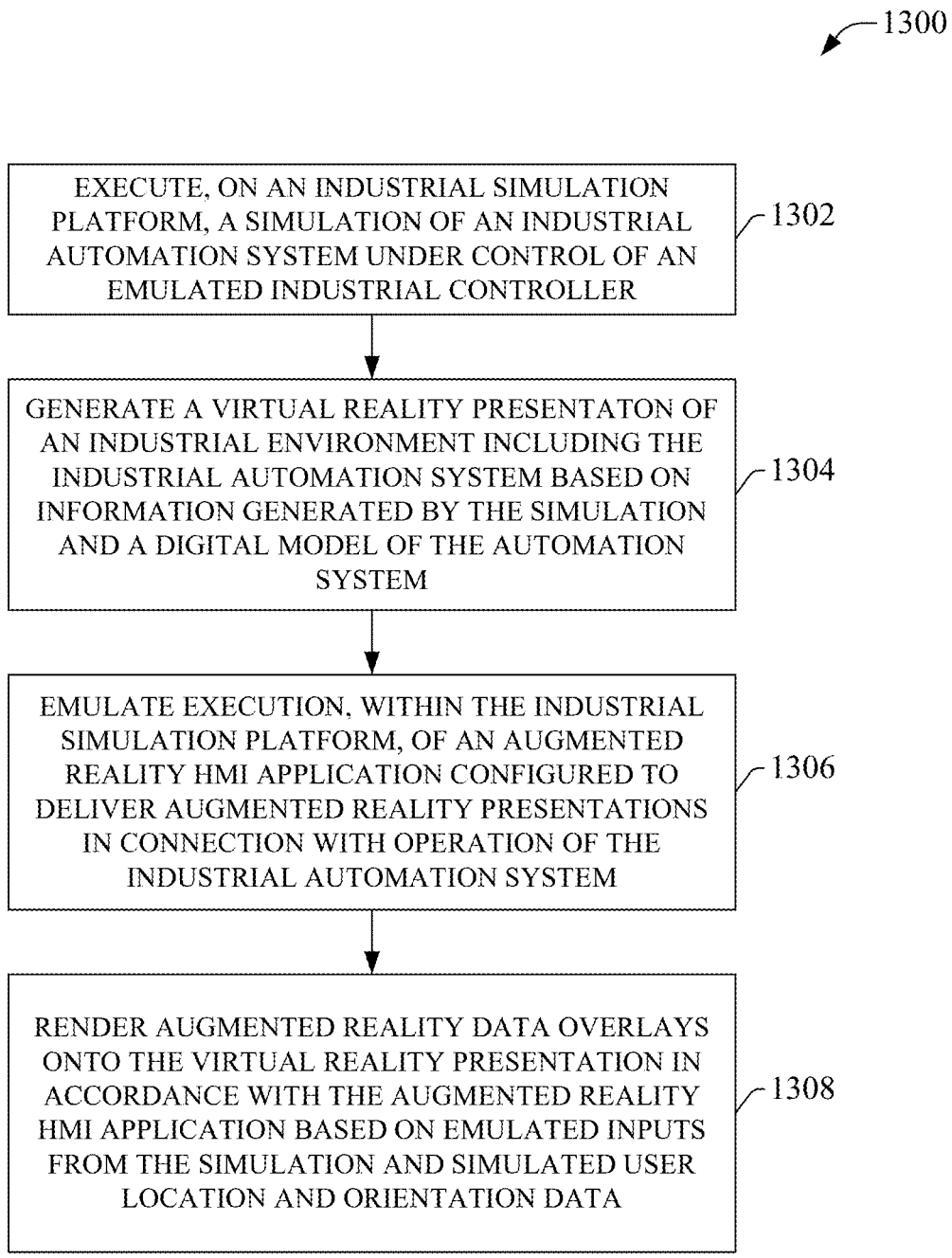
FIG. 13 is a flowchart of an example methodology for executing an augmented reality HMI application within a virtual reality industrial environment.

FIG. 13 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for executing an augmented reality HMI application within a virtual reality industrial environment. Initially, at 1302, a simulation of an industrial automation system is executed under control of an emulated industrial controller. In some embodiments, the simulation can be executed based on a digital model or digital twin of the automation system that models mechanical, physical, and behavioral properties of the various components that make up the automation system. At 1304, a three-dimensional virtual reality presentation of an industrial environment including the industrial automation system is generated based on information generated by the simulation and the digital model of the automation system. The virtual reality presentation can be rendered on a client device and can comprise, for example, an interactive virtual environment that can be navigated in three dimensions through interaction with the client device's display. The presentation can be animated in accordance with the simulation to graphically convey operations, movements, and statuses of the virtualized automation system.

At 1306, execution of an augmented reality HMI application is emulated within the industrial simulation platform. The augmented reality HMI application is configured to deliver augmented reality presentations in connection with operation of the physical automation system being simulated. Although the HMI application is configured to be executed on an AR HMI system in the field for delivery of augmented reality data to wearable AR appliances, the industrial simulation platform supports execution of such AR HMI applications for rendering of substantially equivalent augmented reality presentations on the virtual reality presentation.

At 1308, augmented reality overlays are rendered onto the virtual reality presentation in accordance with the augmented reality HMI application. The AR data overlays are generated based on emulated inputs from the simulation and simulated user location and orientation data corresponding to the user's current perspective of the virtual reality environment.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
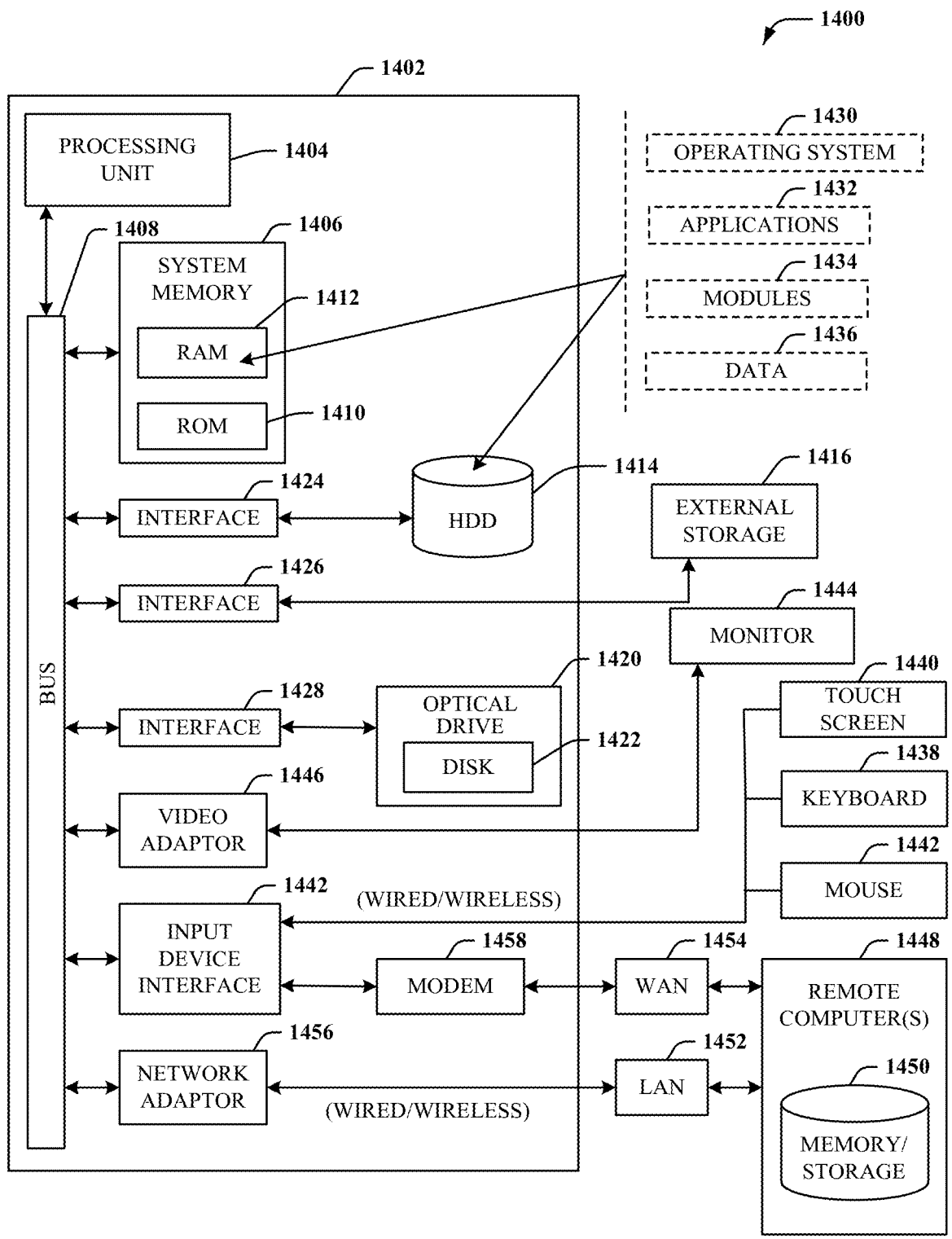
FIG. 14 is an example computing environment.
Figure 15:
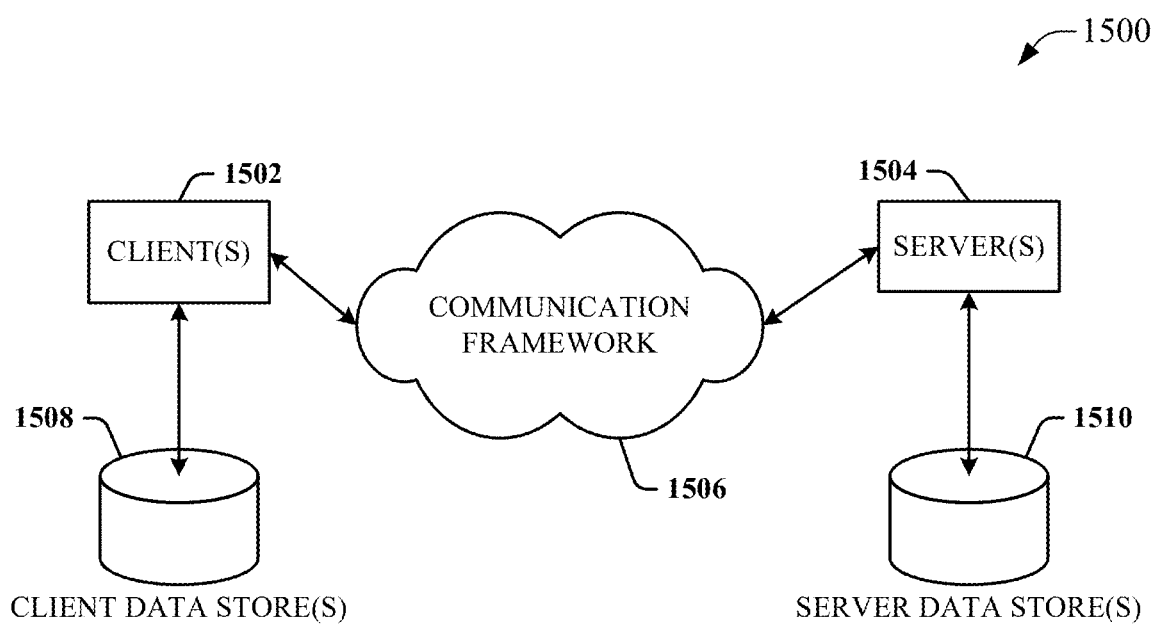
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14 In such an embodiment, operating system 1430 can comprise one virtual machine (VM) of multiple VMs hosted at computer 1402. Furthermore, operating system 1430 can provide runtime environments, such as the Java runtime environment or the .NET framework, for application programs 1432. Runtime environments are consistent execution environments that allow application programs 1432 to run on any operating system that includes the runtime environment. Similarly, operating system 1430 can support containers, and application programs 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1444 or other type of display device can be also connected to the system bus 1408 via an interface, such as a video adapter 1448. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the adapter 1456 in a wireless mode.

When used in a WAN networking environment, the computer 1402 can include a modem 1458 or can be connected to a communications server on the WAN 1454 via other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1452 or WAN 1454 e.g., by the adapter 1456 or modem 1458, respectively. Upon connecting the computer 1402 to an associated cloud storage system, the external storage interface 1426 can, with the aid of the adapter 1456 and/or modem 1458, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a simulation component configured to execute a simulation of an automation system under control of an emulated industrial control program based on a digital model of the automation system;
a user interface component configured to render a virtual reality presentation of an industrial environment that includes the automation system, wherein the virtual reality presentation animates a three-dimensional virtual representation of the automation system in accordance with the simulation; and
an augmented reality human-machine interface (HMI) emulation component configured to:
execute an augmented reality HMI application that is configured to render, in response to execution on an augmented reality presentation system, augmented reality presentation data on a client device over a field of view of the automation system, and
overlay, in accordance with execution of the augmented reality HMI application, the augmented reality presentation data onto the virtual reality presentation based on a simulated user location and orientation within the virtual reality presentation of the industrial environment generated via user interaction with the virtual reality presentation.

2. The system of claim 1, wherein the augmented reality HMI application defines, as a function of the field of view, data items to be rendered on the client device and locations of the data items within the field of view.

3. The system of claim 1, wherein
the augmented reality HMI emulation component is configured to generate the augmented reality presentation data in accordance with the augmented reality HMI application based on the simulated user location and orientation and emulated controller data generated by a controller emulation component that executes the emulated industrial control program, and
the user interface component is configured to overlay the augmented reality presentation data at locations within the virtual reality presentation that simulate a user's view of the automation system through a wearable augmented reality appliance.

4. The system of claim 3, wherein the augmented reality presentation data comprises a subset of the emulated controller data relevant to an aspect of the automation system that is within a current field of view corresponding to the simulated user location and orientation.

5. The system of claim 4, wherein the subset of the emulated controller data comprises at least one of a value of a virtual controller tag set by the emulated industrial control program, virtualized telemetry data, or a virtual alarm.

6. The system of claim 1, further comprising a controller emulation component configured to execute the emulated industrial control program and to exchange simulated input signals and output signals with the simulation of the automation system in accordance with the emulated industrial control program.

7. The system of claim 1, wherein the simulated user location and orientation is generated in accordance with navigational input received via user interaction with the virtual reality presentation that controls a simulated traversal through the industrial environment.

8. The system of claim 1, wherein the executable components further comprise:
 a mechanical modeling component configured to generate a three-dimensional (3D) mechanical model of the automation system based on mechanical design input data; and
 an aspect metadata component configured to assign aspect metadata to selected elements of the 3D mechanical in accordance with aspect input data, the aspect metadata defining simulation behaviors of the selected elements to yield the digital model of the automation system.

9. The system of claim 8, wherein
 the user interface component is configured to receive the aspect specification input data via interaction with a graphical interface display rendered by the user interface component,
 the graphical interface display comprises a toolbar that renders a set of aspects available for selection and assignment to the selected elements, and
 the aspect specification input data selects an aspect from the set of the aspects and indicates an element, of the selected elements, to which the aspect is to be assigned.

10. A method, comprising:
 simulating, by a system comprising a processor, an industrial automation system under control of an emulated industrial control program based on a digital model of the industrial automation system;
 rendering, by the system, a virtual reality visualization of an industrial facility in which the industrial automation system operates, wherein the virtual reality visualization animates a three-dimensional virtual representation of the industrial automation system in accordance with the simulating;
 executing, by the system, an augmented reality human-machine interface (HMI) application that is executable on an augmented reality presentation system that renders, based on execution of the augmented reality HMI application, augmented reality data on a client device over a field of view of the industrial automation system;
 receiving, by the system, location and orientation data representing a simulated user location and orientation within the virtual reality visualization of the industrial facility; and
 layering, by the system, the augmented reality data onto the virtual reality visualization based on the user location and orientation data and the executing of the augmented reality HMI application.

11. The method of claim 10, wherein the augmented reality HMI application defines, as a function of the field of view, data items to be rendered on the wearable augmented reality appliance and locations of the data items within the field of view.

12. The method of claim 10, wherein the layering comprises:
 generating the augmented reality data in accordance with the augmented reality HMI application based on the user location and orientation data and emulated controller data generated based on execution of the emulated industrial control program, and
 overlaying the augmented reality data at locations within the virtual reality visualization that simulate a user's view of the industrial automation system through a wearable augmented reality appliance.

13. The method of claim 12, wherein the layering further comprises:
 determining an aspect of the industrial automation system that is within a current field of view of the virtual reality visualization corresponding to a current simulated user location and orientation indicated by the user location and orientation data, and
 selecting, as the augmented reality data, a subset of the emulated control data defined by the augmented reality HMI application as being relevant to the aspect of the industrial automation system.

14. The method of claim 13, wherein the subset of the emulated controller data comprises at least one of a value of a virtual controller tag set by the emulated industrial control program, virtualized telemetry data, or a virtual alarm.

15. The method of claim 10, further comprising generating, by the system, the user location and orientation data based on navigational input received via user interaction with the virtual reality visualization that controls a simulated traversal through the industrial facility.

16. The method of claim 10, further comprising:
 receiving, by the system, mechanical design input data;
 generating, by the system, a three-dimensional (3D) mechanical model of the industrial automation system based on the mechanical design input data;
 receiving, by the system, aspect specification input data that tags selected components of the 3D mechanical model as being specified aspects of the industrial automation system; and
 assigning, by the system, aspect metadata to the selected components based on the aspect input data, the aspect metadata defining simulation behaviors of the selected components,
 wherein the assigning the aspect metadata converts the 3D mechanical model to the digital model of the industrial automation system capable of simulation in accordance with the simulation behaviors.

17. The method of claim 16, further comprising rendering a graphical interface display for development of the mechanical model,
 wherein
 the mechanical design input data and the aspect specification input data are received via interaction with the graphical interface display,
 the rendering comprises rendering, on the graphical interface display, a toolbar comprising a set of aspects available for selection and assignment to the selected components, and
 the aspect specification input data selects an aspect from the set of the aspects and identifies a component, of the selected components, to which the aspect is to be assigned.

18. A non-transitory computer-readable medium having stored thereon instructions that, in response to execution, cause a system comprising a processor to perform operations, the operations comprising:

executing a simulation of an industrial automation system under control of an emulated industrial control program based on a digital model of the industrial automation system;

rendering, based on the simulation, a virtual reality presentation of an industrial environment in which the industrial automation system operates, wherein the virtual reality presentation animates a three-dimensional virtual representation of the industrial automation system;

executing an augmented reality human-machine interface (HMI) application that is configured to render, in response to execution on an augmented reality presentation system, augmented reality (AR) presentation data on a client device over a field of view of the industrial automation system; and layering the augmented reality presentation data onto the virtual reality presentation in accordance with the augmented reality HMI application and based on user location and orientation data representing a simulated user location and orientation within the virtual reality presentation of the industrial environment.

19. The non-transitory computer-readable medium of claim 18, wherein the layering comprises:

generating the augmented reality presentation data in accordance with the augmented reality HMI application based on the user location and orientation data and emulated controller data generated based on execution of the emulated industrial control program, and overlaying the augmented reality presentation data at locations within the virtual reality presentation that simulate a user's view of the industrial automation system through a wearable augmented reality appliance.

20. The non-transitory computer-readable medium of claim 19, wherein the layering further comprises:

determining an aspect of the industrial automation system that is within a current field of view of the virtual reality presentation corresponding to a current simulated user location and orientation indicated by the user location and orientation data, and selecting, as the augmented reality presentation data, a subset of the emulated controller data defined by the augmented reality HMI application as being relevant to the aspect of the industrial automation system.

* * * * *